(12) United States Patent
Jackson

(10) Patent No.: US 11,981,416 B2
(45) Date of Patent: *May 14, 2024

(54) AIRCRAFT DOOR HINGE ROTATION

(71) Applicant: The Boeing Company, Chicago, IL (US)

(72) Inventor: Rick A. Jackson, Fountain Valley, CA (US)

(73) Assignee: THE BOEING COMPANY, Chicago, IL (US)

(*) Notice: Subject to any disclaimer, the term of this patent is extended or adjusted under 35 U.S.C. 154(b) by 48 days.

This patent is subject to a terminal disclaimer.

(21) Appl. No.: 18/048,525

(22) Filed: Oct. 21, 2022

(65) Prior Publication Data

US 2023/0067268 A1    Mar. 2, 2023

Related U.S. Application Data

(63) Continuation of application No. 16/247,088, filed on Jan. 14, 2019, now Pat. No. 11,511,844.

(51) Int. Cl.
| | | |
|---|---|---|
| *B64C 1/14* | (2006.01) | |
| *E05D 3/02* | (2006.01) | |
| *E05D 5/02* | (2006.01) | |

(52) U.S. Cl.
CPC .............. *B64C 1/1415* (2013.01); *E05D 3/02* (2013.01); *E05D 5/0207* (2013.01); *E05Y 2900/502* (2013.01); *E05Y 2900/531* (2013.01)

(58) Field of Classification Search
CPC ........... B64C 1/1415; B64C 1/22; E05D 3/02; E05D 5/0207; E05Y 2900/502; E05Y 2900/531

See application file for complete search history.

(56) References Cited

U.S. PATENT DOCUMENTS

| | | | | |
|---|---|---|---|---|
| 1,949,581 A | * | 3/1934 | Place ................... | E05F 1/1215 49/398 |
| 2,268,009 A | | 12/1941 | Babb et al. | |

(Continued)

FOREIGN PATENT DOCUMENTS

| | | |
|---|---|---|
| CN | 102458284 | 5/2012 |
| CN | 103624257 | 3/2014 |

(Continued)

OTHER PUBLICATIONS

Extended European Search Report dated May 5, 2020; EP Application 19215878.

*Primary Examiner* — Nicholas McFall
*Assistant Examiner* — Marisa V Conlon
(74) *Attorney, Agent, or Firm* — Perman & Green, LLP

(57) ABSTRACT

An aircraft fuselage end cargo door mechanism including a hinge rotatably coupling an aircraft fuselage end cargo door to a fuselage. The hinge being coupled to both the aircraft fuselage end cargo door and the fuselage so that an entirety of an axis of rotation of the aircraft fuselage end cargo door, defined by the hinge, relative to the fuselage is located forward of an entirety of a major joint line between the aircraft fuselage end cargo door and the fuselage. An uppermost portion of the major joint line comprises a joint line radius where a portion of the joint line radius formed by the aircraft fuselage end cargo door pivots within another portion of the joint line radius formed by the fuselage.

20 Claims, 19 Drawing Sheets

(56) References Cited

U.S. PATENT DOCUMENTS

| | | | |
|---|---|---|---|
| 2,323,279 | A | 6/1943 | Van Zelm |
| 2,759,691 | A | 8/1956 | Weaver et al. |
| 2,879,642 | A * | 3/1959 | Hiatt ................. F02K 1/58 244/110 B |
| 3,002,719 | A | 10/1961 | Weiland et al. |
| 3,009,672 | A | 11/1961 | Tharratt |
| 3,051,419 | A | 8/1962 | Weiland et al. |
| 3,055,620 | A | 9/1962 | Weiland |
| 3,150,849 | A | 9/1964 | Conway et al. |
| 3,335,981 | A | 8/1967 | Pauli et al. |
| 3,374,972 | A | 3/1968 | Webb, Sr. |
| 3,433,439 | A | 3/1969 | Brame et al. |
| 3,653,615 | A | 4/1972 | Spence |
| 4,039,163 | A | 8/1977 | Shorey |
| 4,185,415 | A * | 1/1980 | LaConte ................. E05D 3/06 49/248 |
| 4,186,901 | A | 2/1980 | Shorey |
| 4,235,399 | A | 11/1980 | Shorey |
| 4,834,600 | A | 5/1989 | Lemke |
| 6,663,045 | B2 | 12/2003 | Salmon |
| 7,993,085 | B2 | 8/2011 | McClure |
| 8,388,289 | B2 | 3/2013 | Mazur et al. |
| 8,439,308 | B2 * | 5/2013 | Armstrong ............. G05B 17/02 244/129.4 |
| 8,763,951 | B2 | 7/2014 | Smith |
| 9,562,554 | B2 | 2/2017 | Vidal et al. |
| 9,608,320 | B2 | 3/2017 | Fournie et al. |
| 10,648,213 | B2 * | 5/2020 | Wright ................. E05D 11/1007 |
| 2003/0150956 | A1 | 8/2003 | Salmon |
| 2005/0103934 | A1 | 5/2005 | Smith, Jr. |
| 2005/0247824 | A1 | 11/2005 | Allison, Sr. |
| 2006/0022090 | A1 | 2/2006 | McCoskey et al. |
| 2007/0040066 | A1 | 2/2007 | McCoskey et al. |
| 2009/0045288 | A1 | 2/2009 | Nakamura et al. |
| 2010/0252682 | A1 | 10/2010 | Pahl |
| 2011/0008124 | A1 | 1/2011 | Niklewicz et al. |
| 2012/0109301 | A1 | 5/2012 | Thomas et al. |
| 2016/0067778 | A1 | 3/2016 | Liu et al. |
| 2018/0149193 | A1 | 5/2018 | Forstner et al. |
| 2019/0291626 | A1 | 9/2019 | Duffy et al. |

FOREIGN PATENT DOCUMENTS

| | | |
|---|---|---|
| CN | 107708970 | 2/2018 |
| CN | 108907191 | 11/2018 |
| CN | 111561501 | 8/2020 |
| DE | 10130387 | 1/2003 |
| EP | 1334905 | 3/2003 |
| FR | 2783495 | 3/2000 |

* cited by examiner

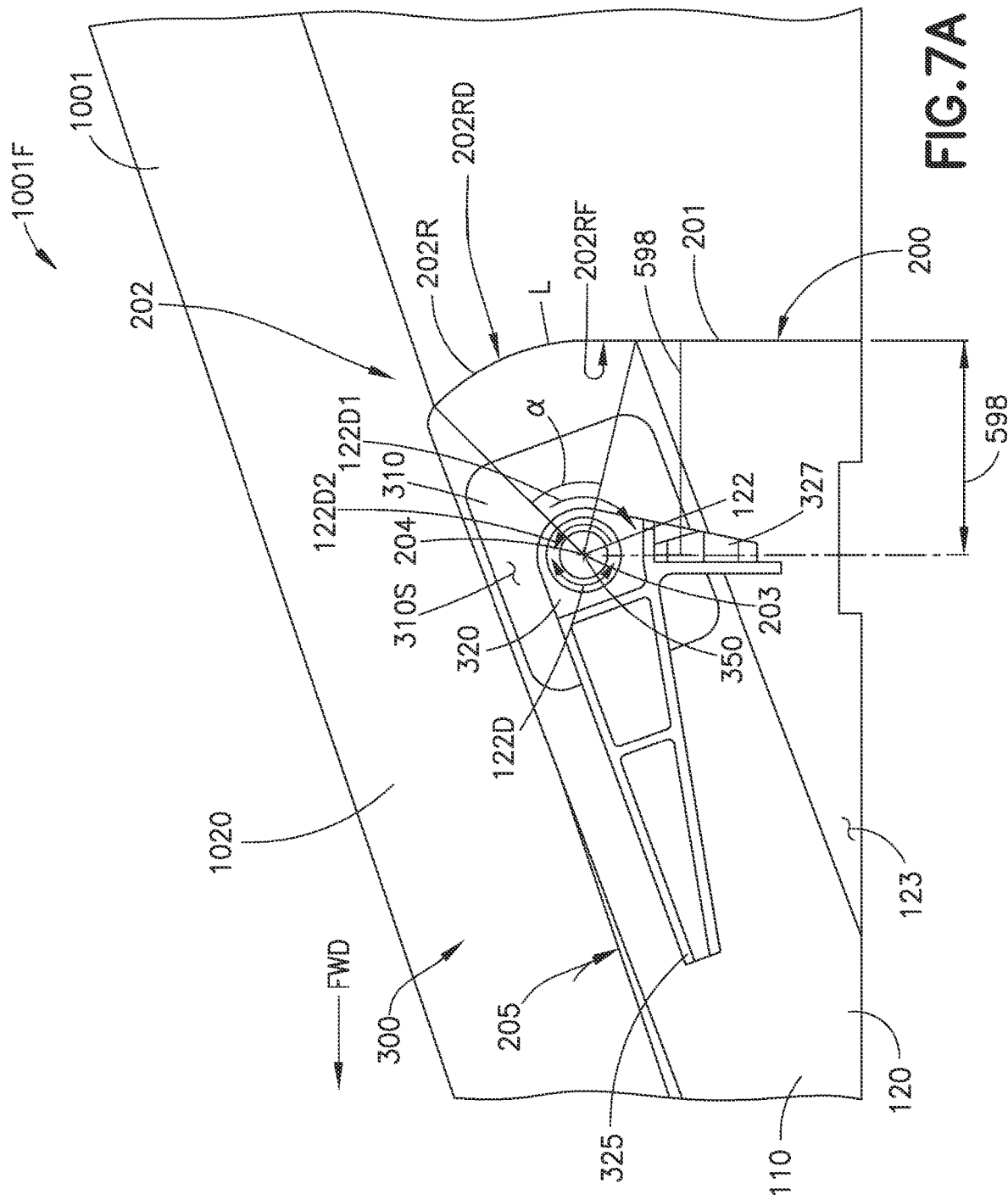

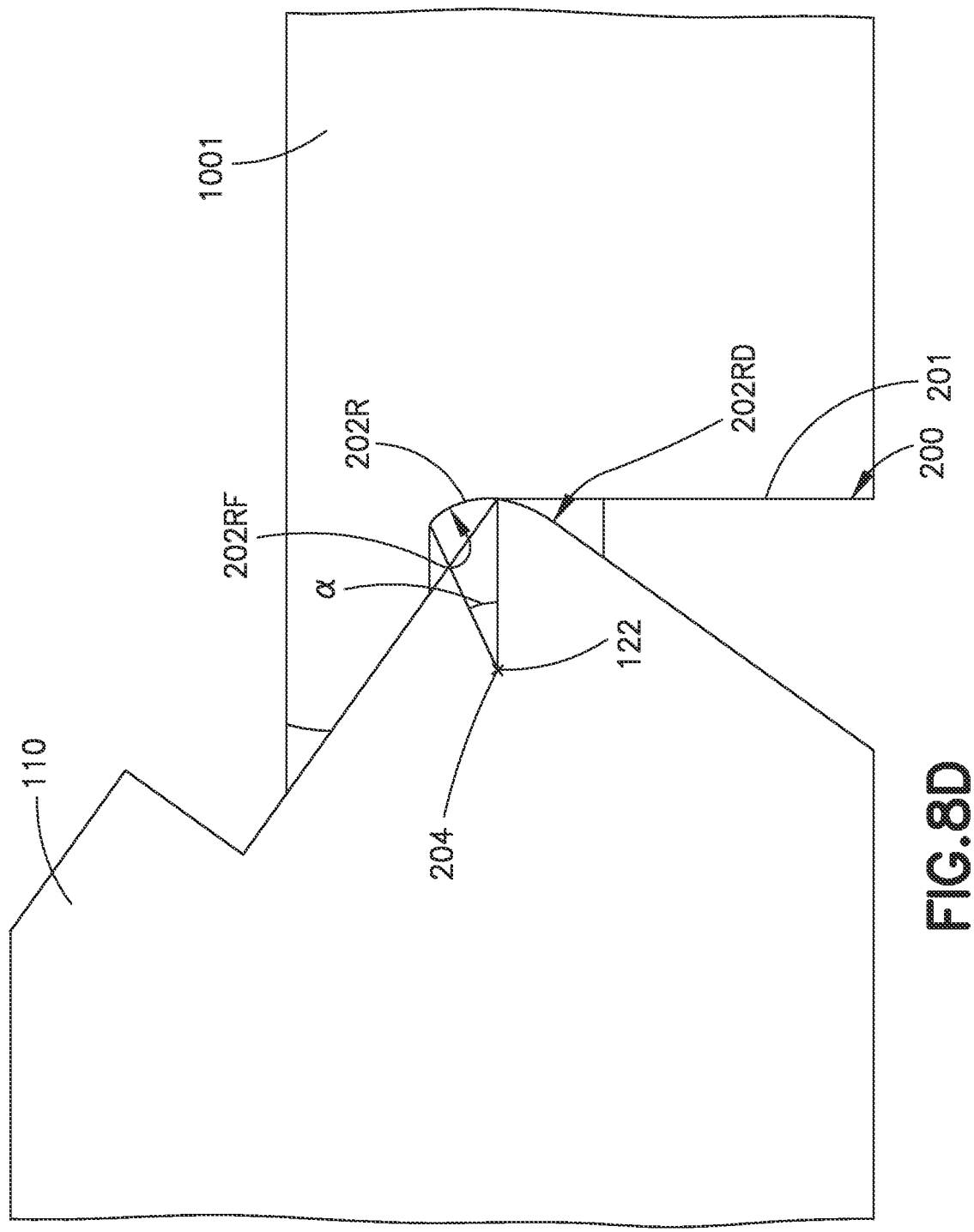

AIRCRAFT DOOR HINGE ROTATION

CROSS-REFERENCE TO RELATED APPLICATIONS

This application is a continuation of U.S. patent application Ser. No. 16/247,088 filed on Jan. 14, 2019 (now U.S. Pat. No. 11,511,844 issued on Nov. 29, 2022), the disclosure of which is incorporated herein by reference in its entirety.

BACKGROUND

1. Field

The exemplary embodiments generally relate to aircraft and in particular to aircraft cargo doors.

2. Brief Description of Related Developments

Cargo aircraft utilized for the transport of, e.g., bulky goods, generally utilized cargo doors to facilitate rapid and efficient loading and subsequent unloading of the bulky goods. End loading of the aircraft through both the nose and tail contribute to expediting the loading and unloading. In order to load/unload through the nose, the cargo aircraft utilizes conventional nose cargo doors at the front of the cargo aircraft where either the conventional nose cargo door or the fuselage includes corner hinge access door panels that provide for non-binding rotation of the cargo door between open and closed positions. Examples of cargo aircraft having the conventional nose cargo door and the hinge access door panels either on the fuselage or the door include the Boeing 747 Freighter, the Lockheed C-5 Galaxy, and the Antonov AN-124 Strategic Airlifter. The conventional cargo door is generally coupled to the fuselage such that a rotation axis of the conventional cargo door, relative to the fuselage, is approximately in line with an aft edge of the conventional cargo door. To ensure that the conventional cargo door rotates properly to an open position without interfering with the fuselage of the cargo aircraft, the corner hinge access door panels open or otherwise rotate away from the fuselage to provide clearance for the rotation of the conventional cargo door relative to the fuselage.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to an aircraft fuselage end cargo door mechanism including a hinge rotatably coupling an aircraft fuselage end cargo door to a fuselage, the hinge being coupled to both the aircraft fuselage end cargo door and the fuselage so that an axis of rotation of the aircraft fuselage end cargo door, defined by the hinge, relative to the fuselage is located forward of a major joint line between the aircraft fuselage end cargo door and the fuselage, wherein an uppermost portion of the major joint line comprises a joint line radius where a portion of the joint line radius formed by the aircraft fuselage end cargo door pivots within another portion of the joint line radius formed by the fuselage.

Another example of the subject matter according to the present disclosure relates to an aircraft fuselage end cargo door mechanism including a pair of hinges rotatably coupling an aircraft fuselage end cargo door to a fuselage, the pair of hinges being coupled to both the aircraft fuselage end cargo door and the fuselage, and a common axis of rotation defined by the pair of hinges, where the aircraft fuselage end cargo door rotates relative to the fuselage about the common axis of rotation, and the common axis of rotation is located forward of a major joint line between the aircraft fuselage end cargo door and the fuselage, wherein a skin of the aircraft fuselage end cargo door, rotating about the common axis of rotation, forms an unarticulated monolithic surface and a skin of the fuselage adjacent the major joint line is unarticulated.

Still another example of the subject matter according to the present disclosure relates to an aircraft fuselage end cargo door mechanism including a hinge rotatably coupling an aircraft fuselage end cargo door to a fuselage, the hinge being coupled to both the aircraft fuselage end cargo door and the fuselage so as to form an axis of rotation of the aircraft fuselage end cargo door, and a major joint line defined by an interface between the aircraft fuselage end cargo door and the fuselage, the axis of rotation of the aircraft fuselage end cargo door being located forward of the major joint line, wherein a skin of the aircraft fuselage end cargo door, rotating about the axis of rotation, forms an unarticulated monolithic surface and a skin of the fuselage adjacent the major joint line is unarticulated.

Still another example of the subject matter according to the present disclosure relates to an aircraft comprising a fuselage, an aircraft fuselage end cargo door, wherein the aircraft fuselage end cargo door couples to the fuselage at a major joint line, and a fuselage end cargo door mechanism comprising a hinge rotatably coupling the aircraft fuselage end cargo door to the fuselage, the hinge being coupled to both the aircraft fuselage end cargo door and the fuselage so that an axis of rotation of the aircraft fuselage end cargo door, defined by the hinge, relative to the fuselage is located forward of the major joint line between the aircraft fuselage end cargo door and the fuselage, wherein an uppermost portion of the major joint line comprises a joint line radius where a portion of the joint line radius formed by the aircraft fuselage end cargo door pivots within another portion of the joint line radius formed by the fuselage.

Still another example of the subject matter according to the present disclosure relates to an aircraft comprising a fuselage, an aircraft fuselage end cargo door, wherein the aircraft fuselage end cargo door couples to the fuselage at a major joint line, and an aircraft fuselage end cargo door mechanism comprising a pair of hinges rotatably coupling the aircraft fuselage end cargo door to the fuselage, the pair of hinges being coupled to both the aircraft fuselage end cargo door and the fuselage, and a common axis of rotation defined by the pair of hinges, where the aircraft fuselage end cargo door rotates relative to the fuselage about the common axis of rotation, and the common axis of rotation is located forward of the major joint line between the aircraft fuselage end cargo door and the fuselage, wherein a skin of the aircraft fuselage end cargo door, rotating about the common axis of rotation, forms an unarticulated monolithic surface and a skin of the fuselage adjacent major joint line is unarticulated.

Still another example of the subject matter according to the present disclosure relates to an aircraft comprising a fuselage, an aircraft fuselage end cargo door configured to interface with the fuselage, and an aircraft fuselage end cargo door mechanism comprising a hinge rotatably coupling the aircraft fuselage end cargo door to the fuselage, the hinge being coupled to both the aircraft fuselage end cargo door and the fuselage so as to form an axis of rotation of the aircraft fuselage end cargo door, and a major joint line defined by the interface between the aircraft fuselage end cargo door and the fuselage, the axis of rotation of the aircraft fuselage end cargo door being located forward of the major joint line, wherein a skin of the aircraft fuselage end cargo door, rotating about the axis of rotation, forms an unarticulated monolithic surface and a skin of the fuselage adjacent major joint line is unarticulated.

BRIEF DESCRIPTION OF THE DRAWINGS

Figure 1A:
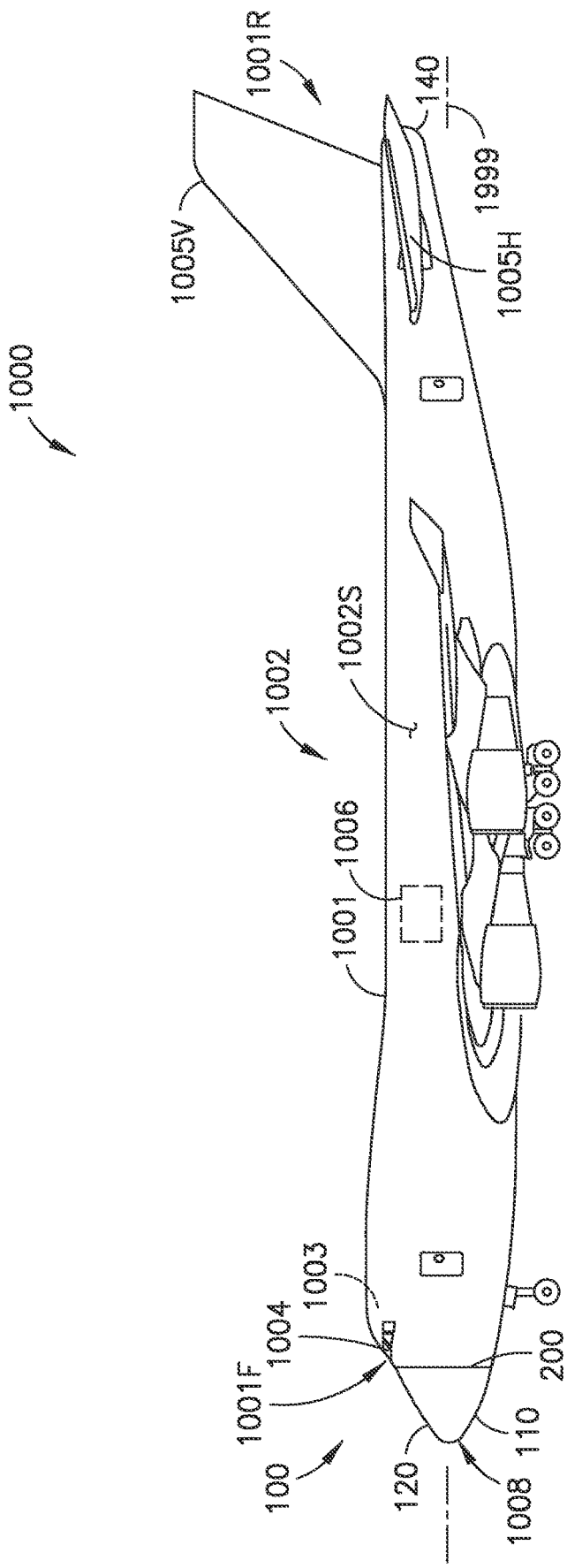
Figure 1B:
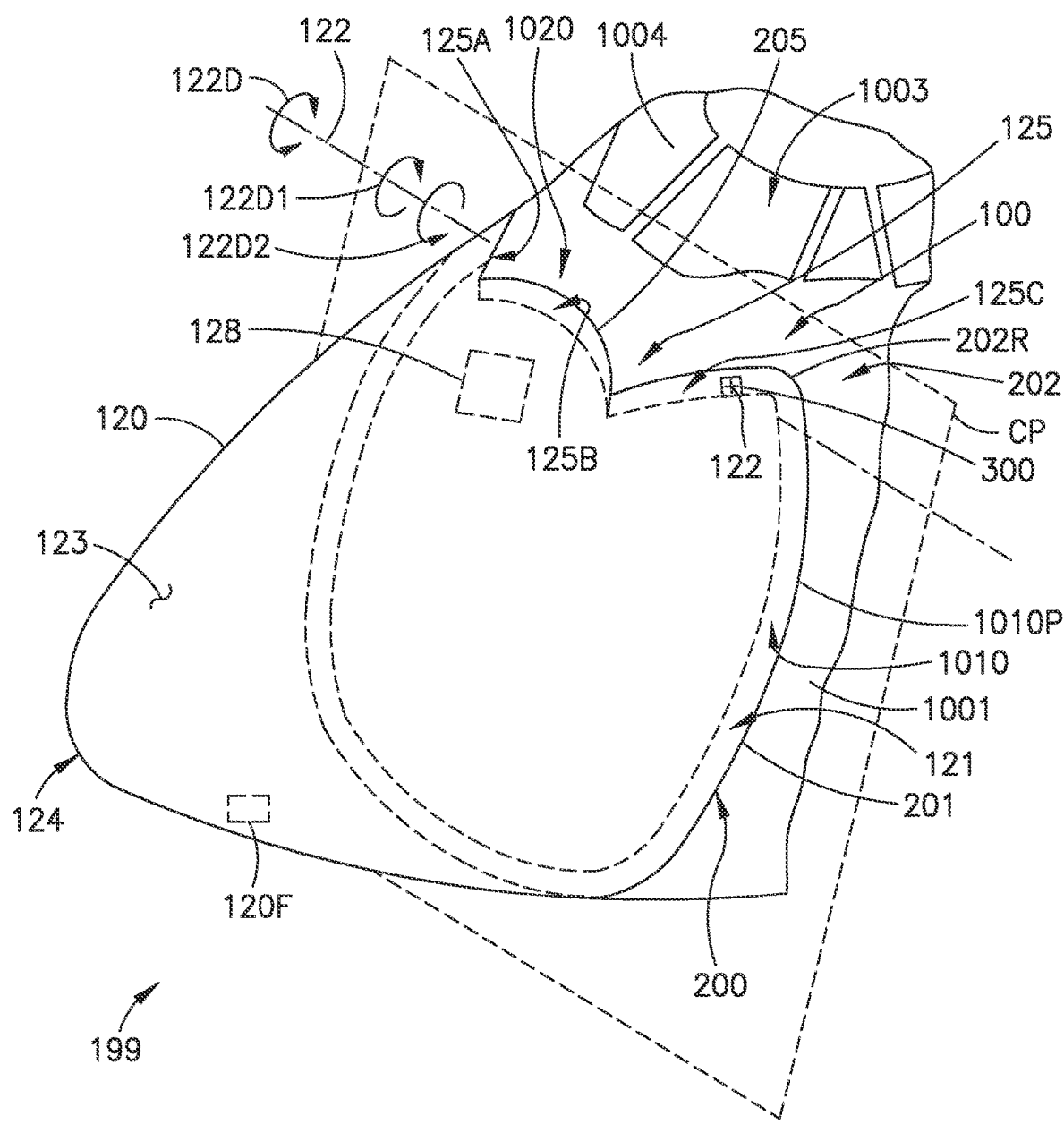
Figure 1C:
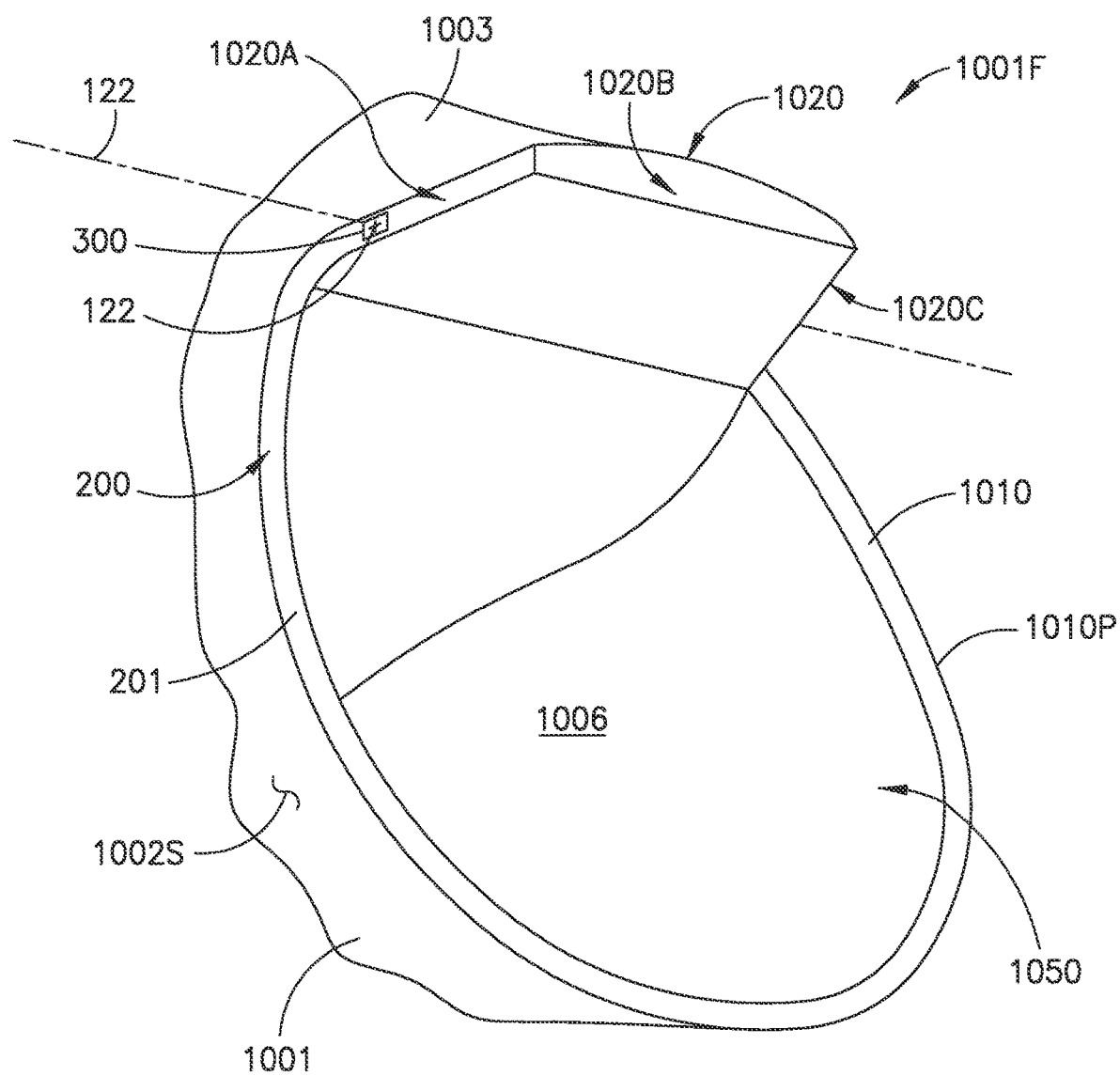
Figure 2:
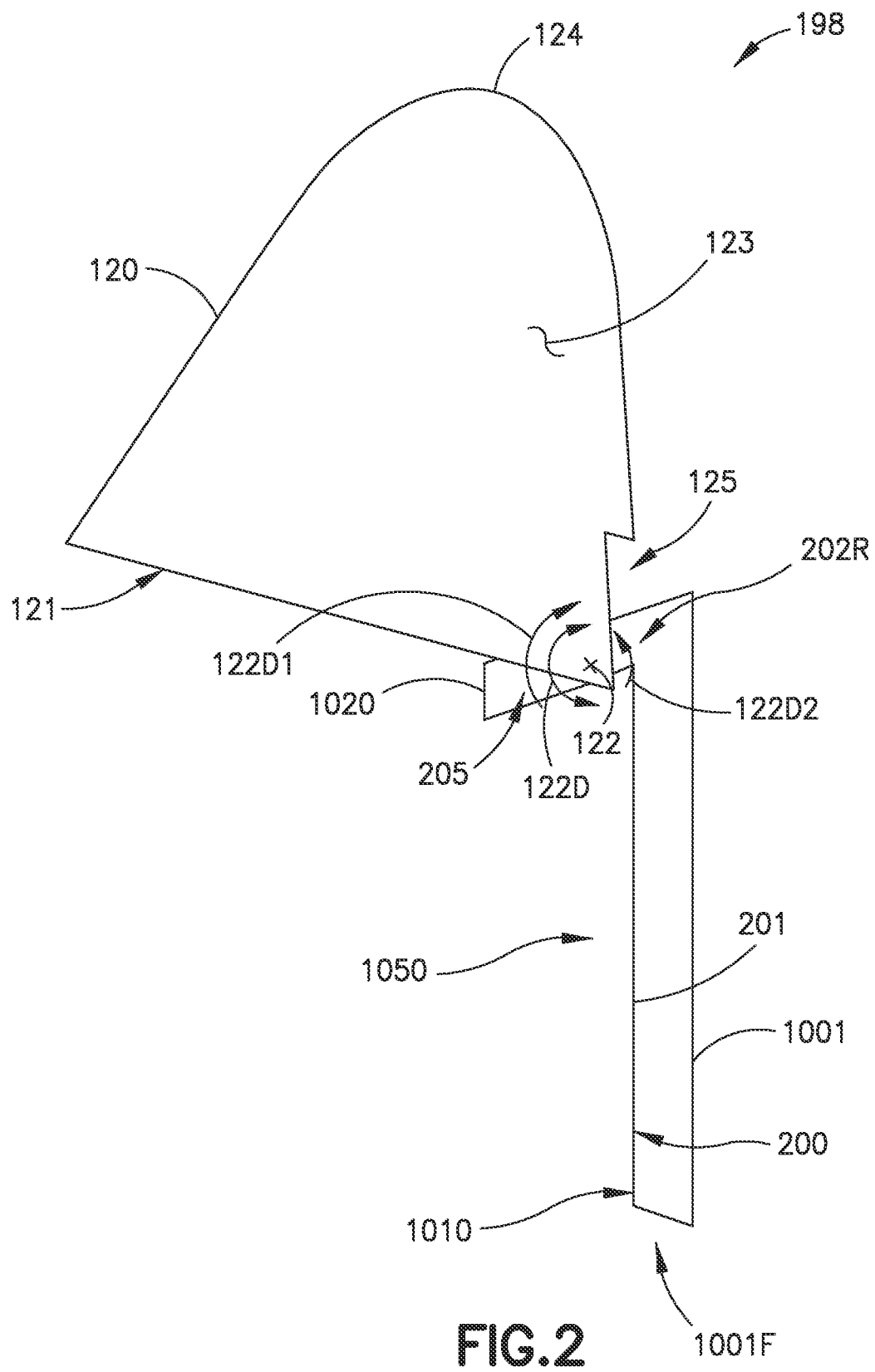
Figure 3:
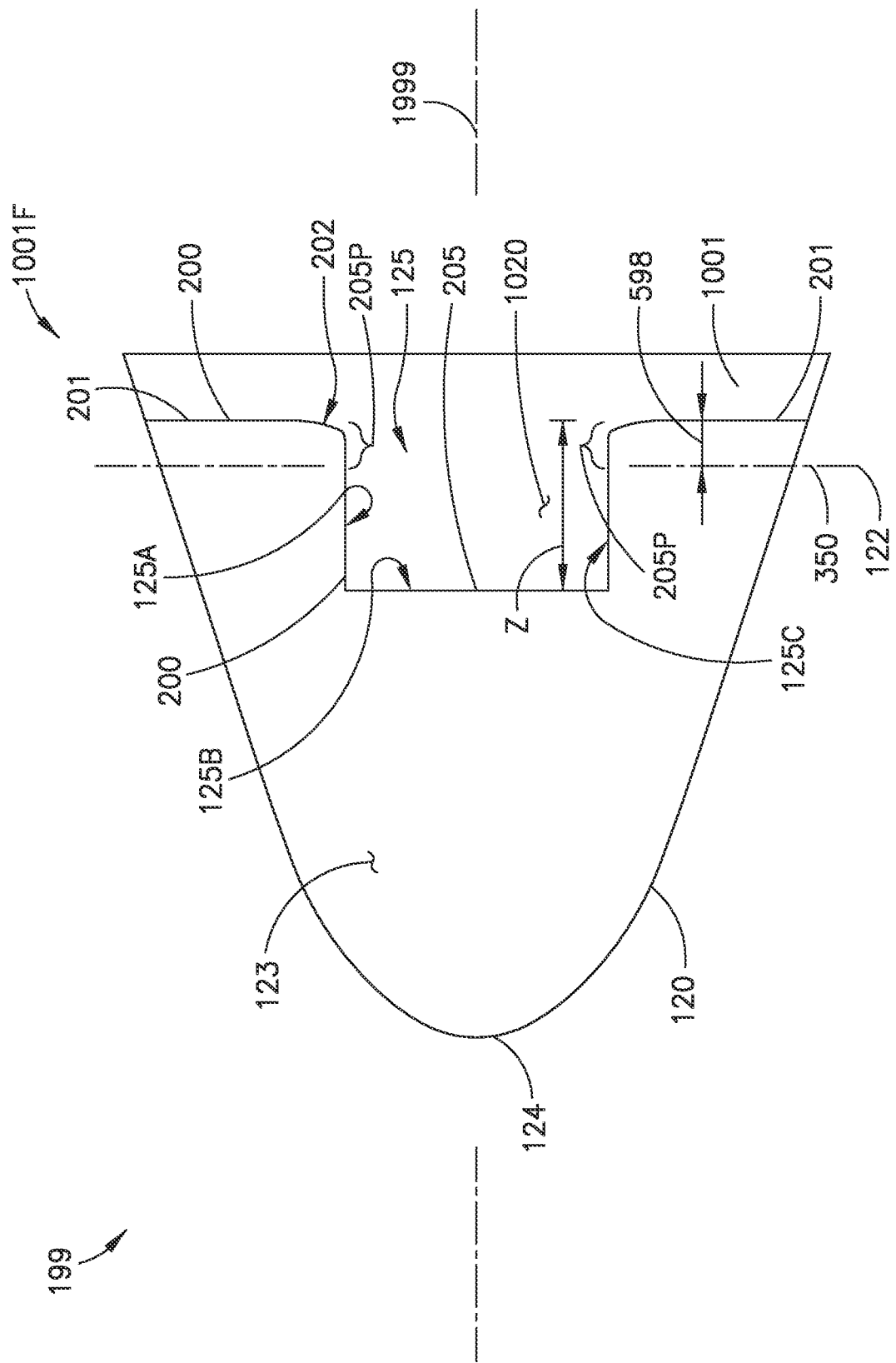
Figure 4:
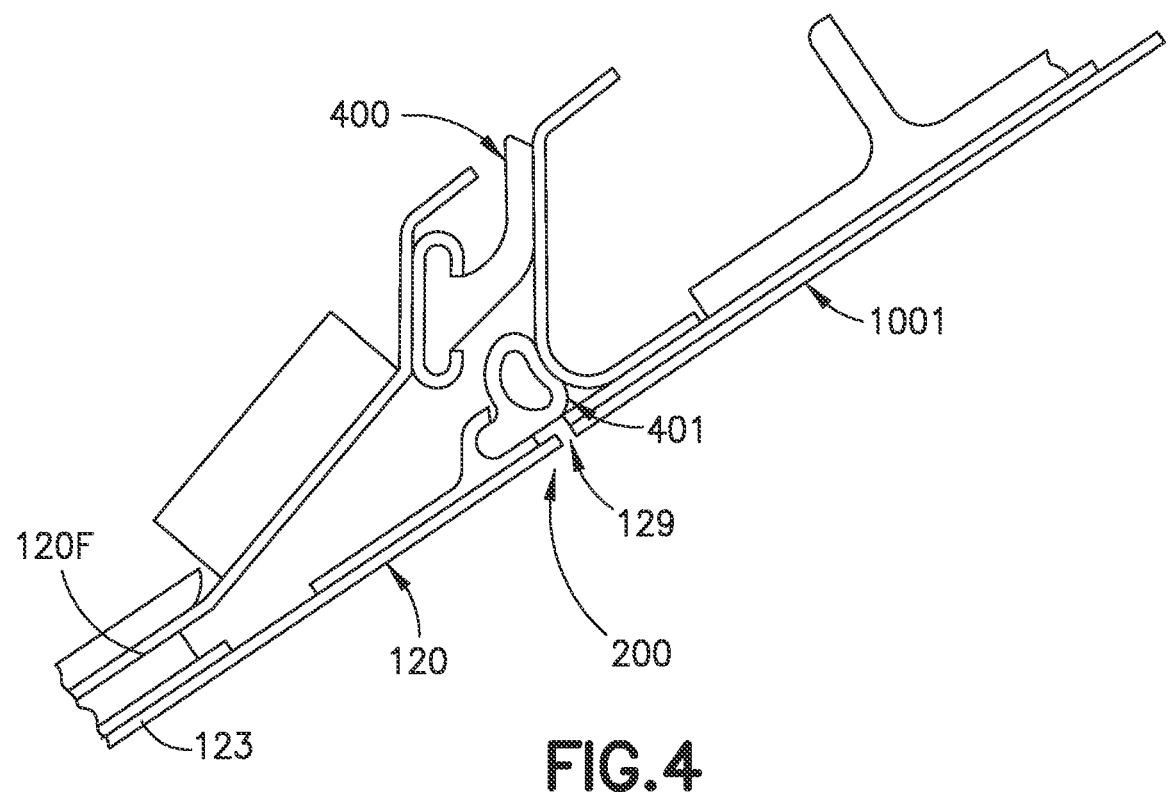
Figure 5:
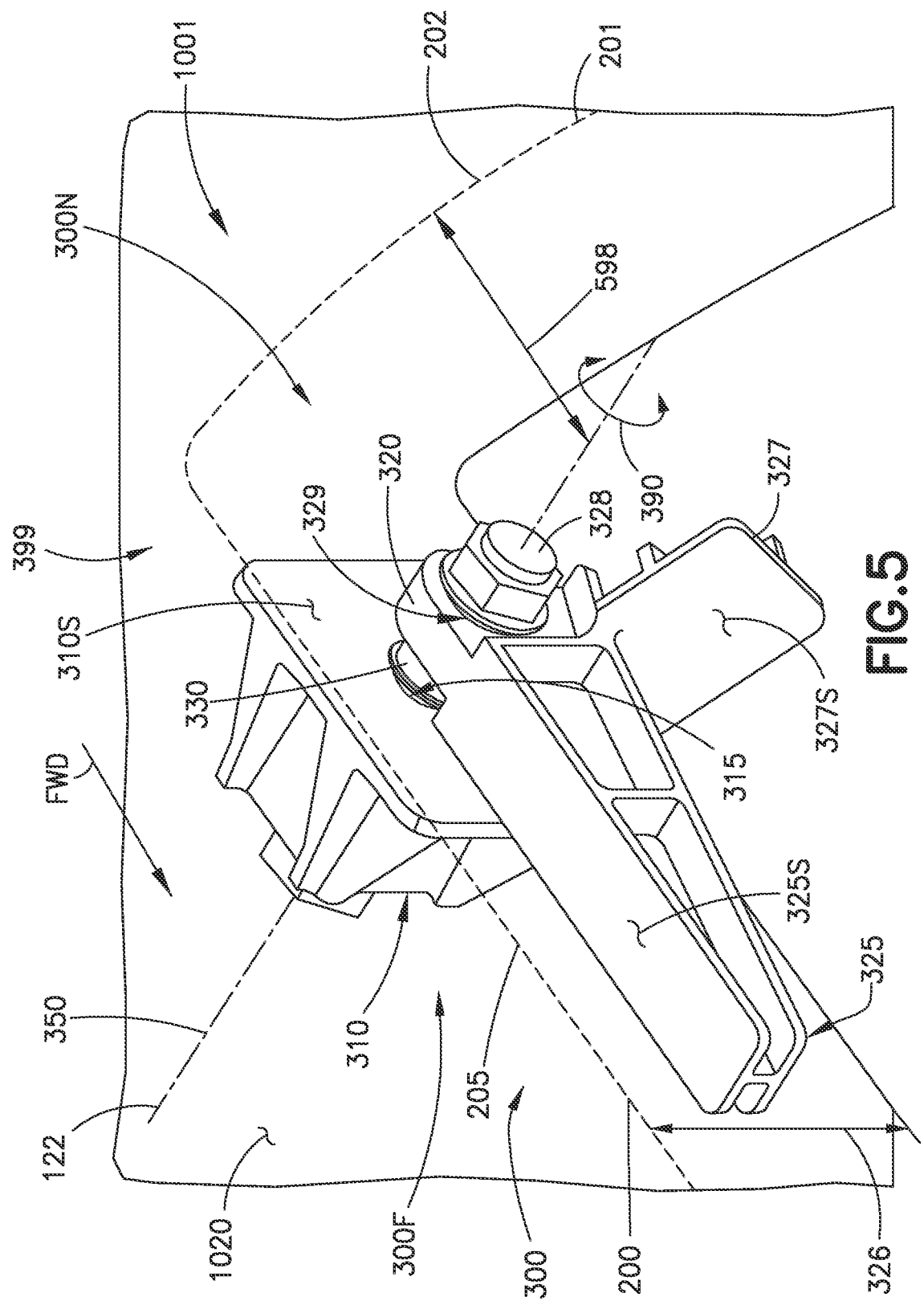
Figure 6:
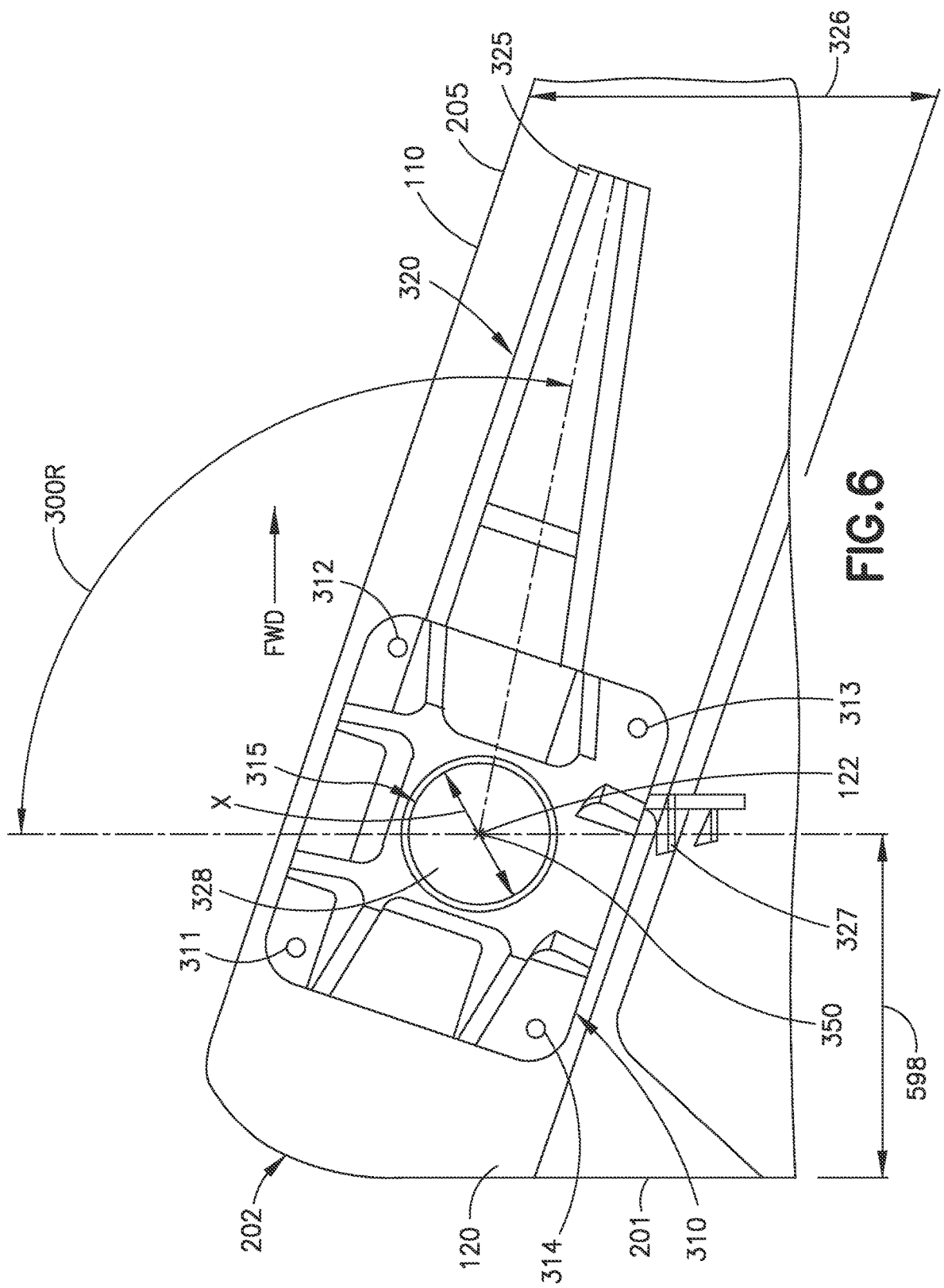
Figure 7B:
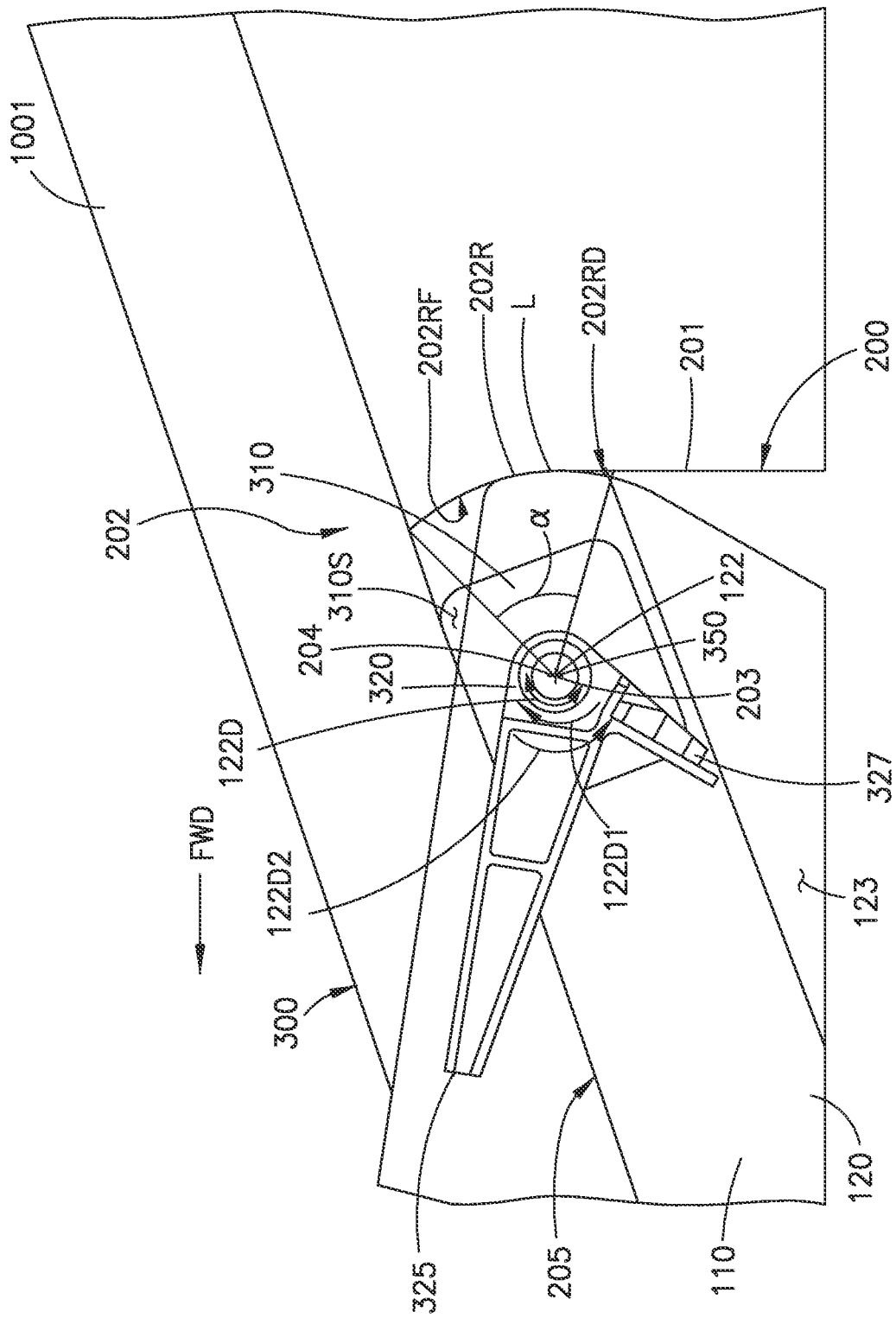
Figure 7C:
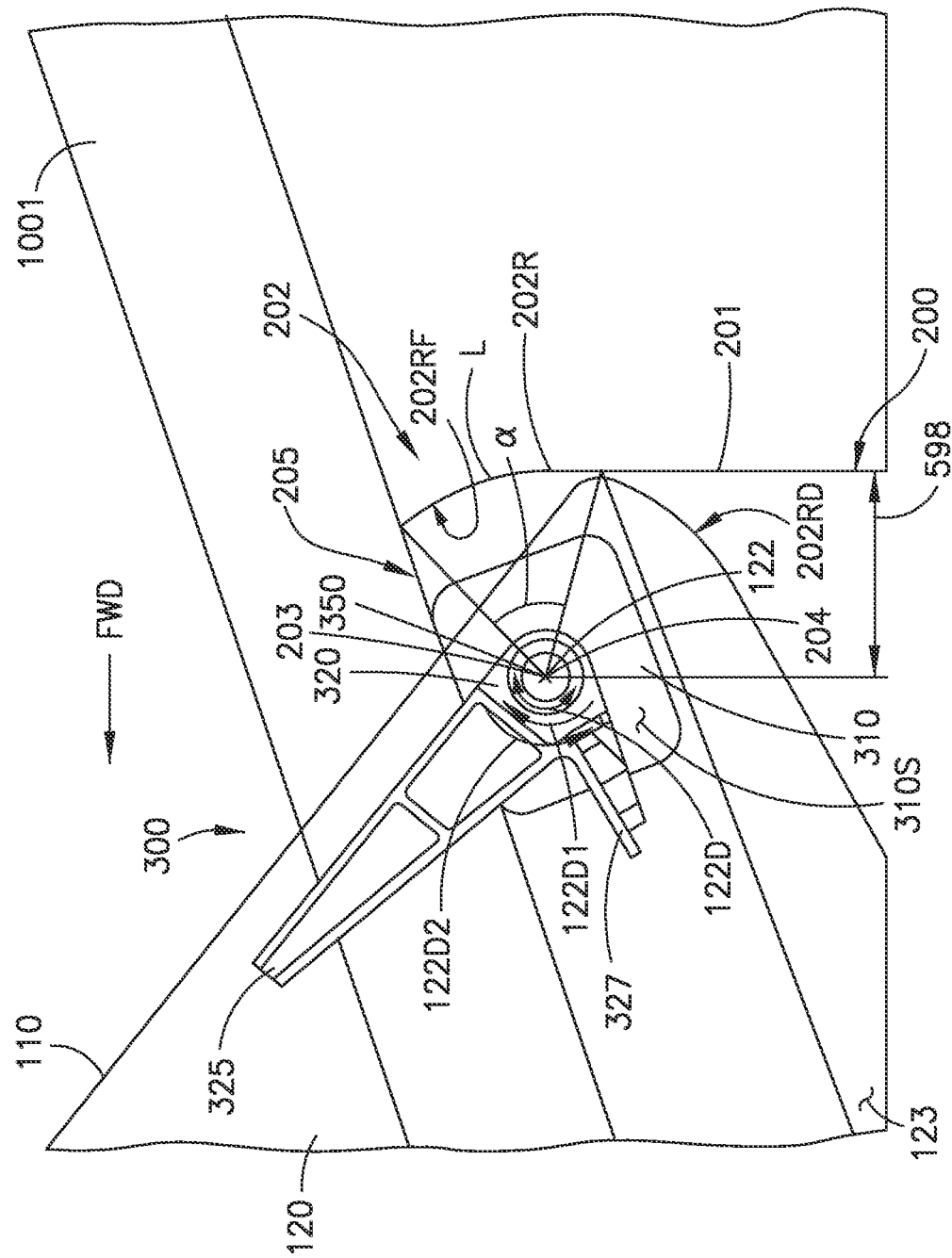
Figure 7D:
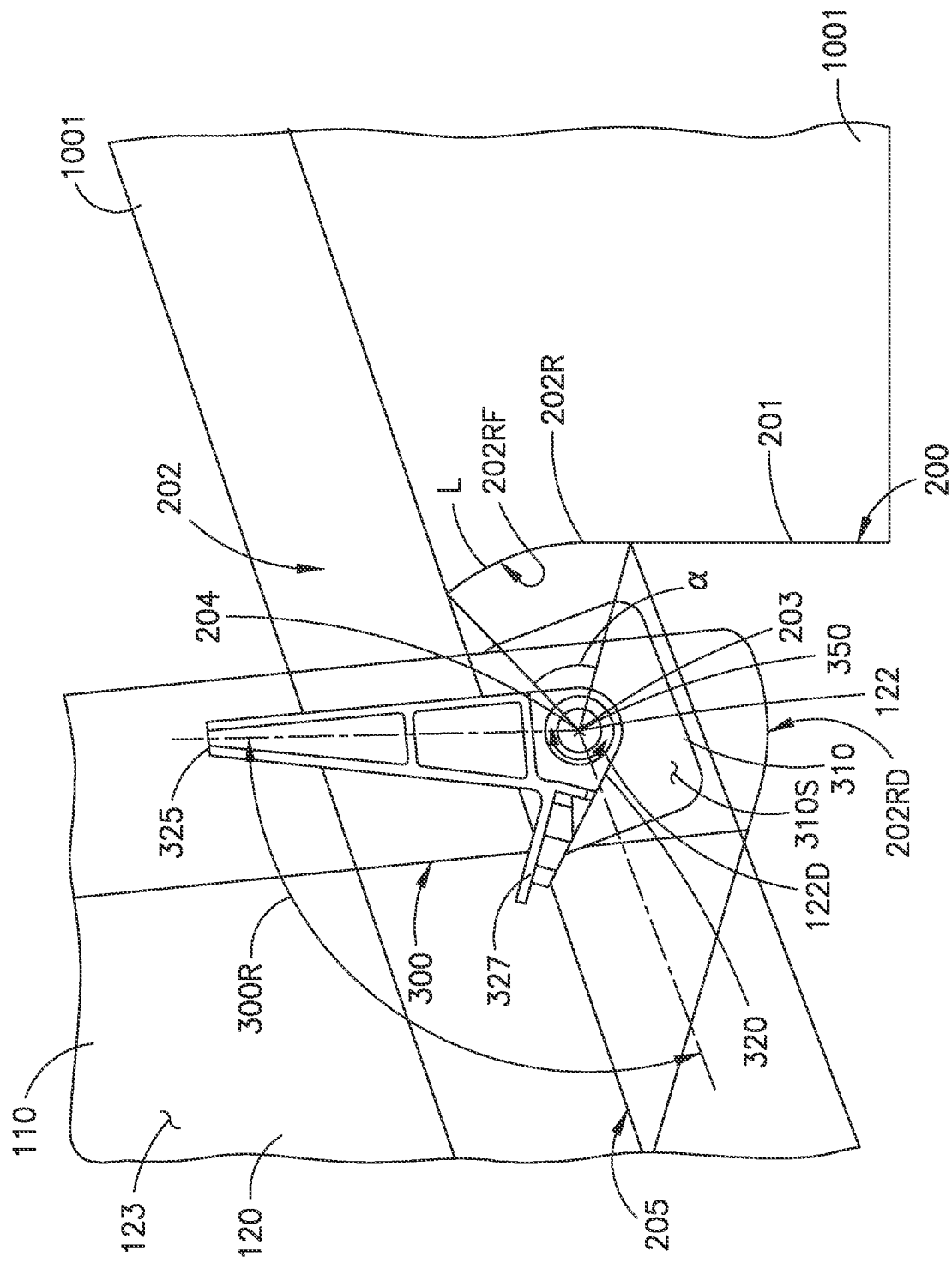
Figure 8A:
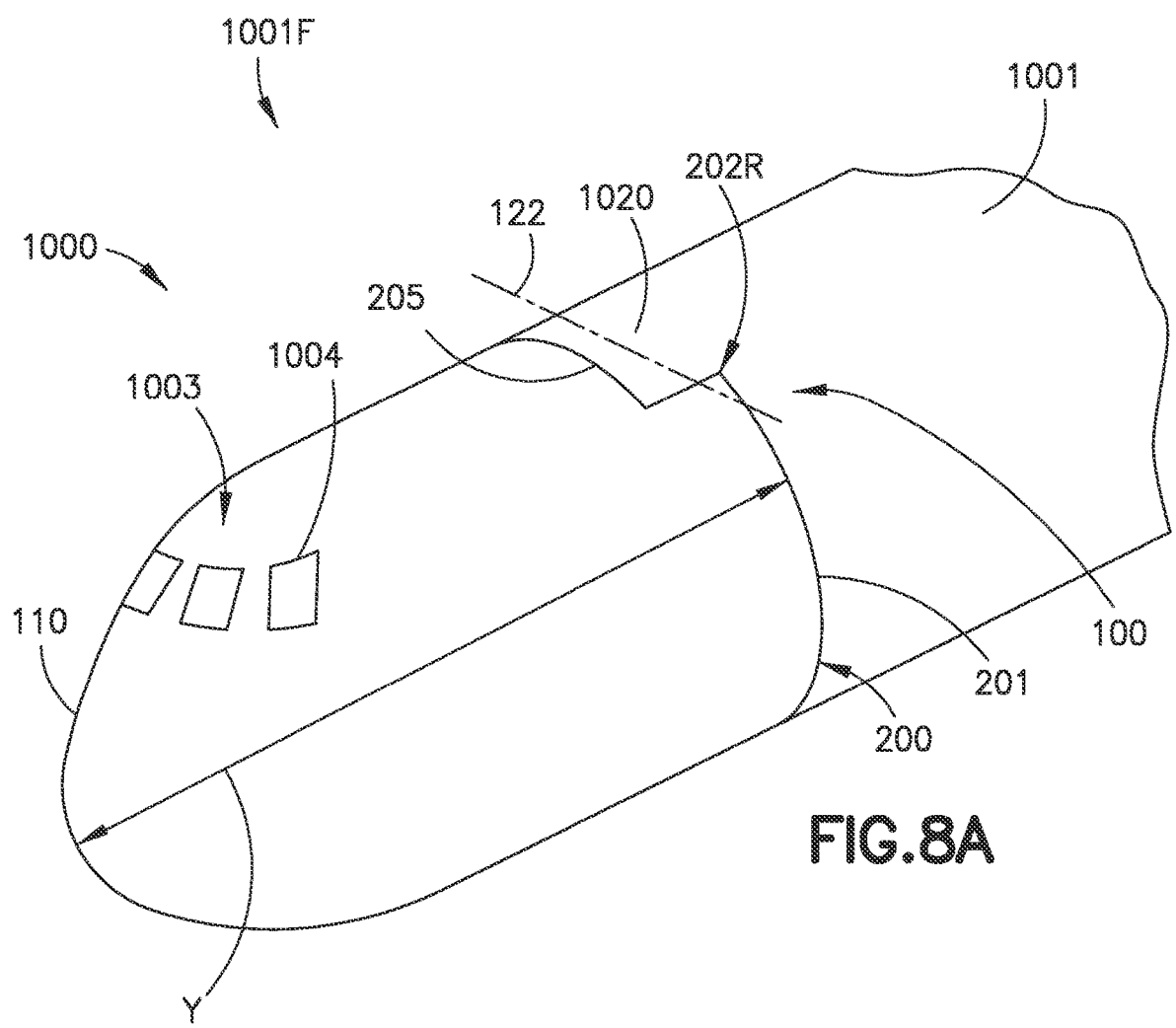
Figure 8B:
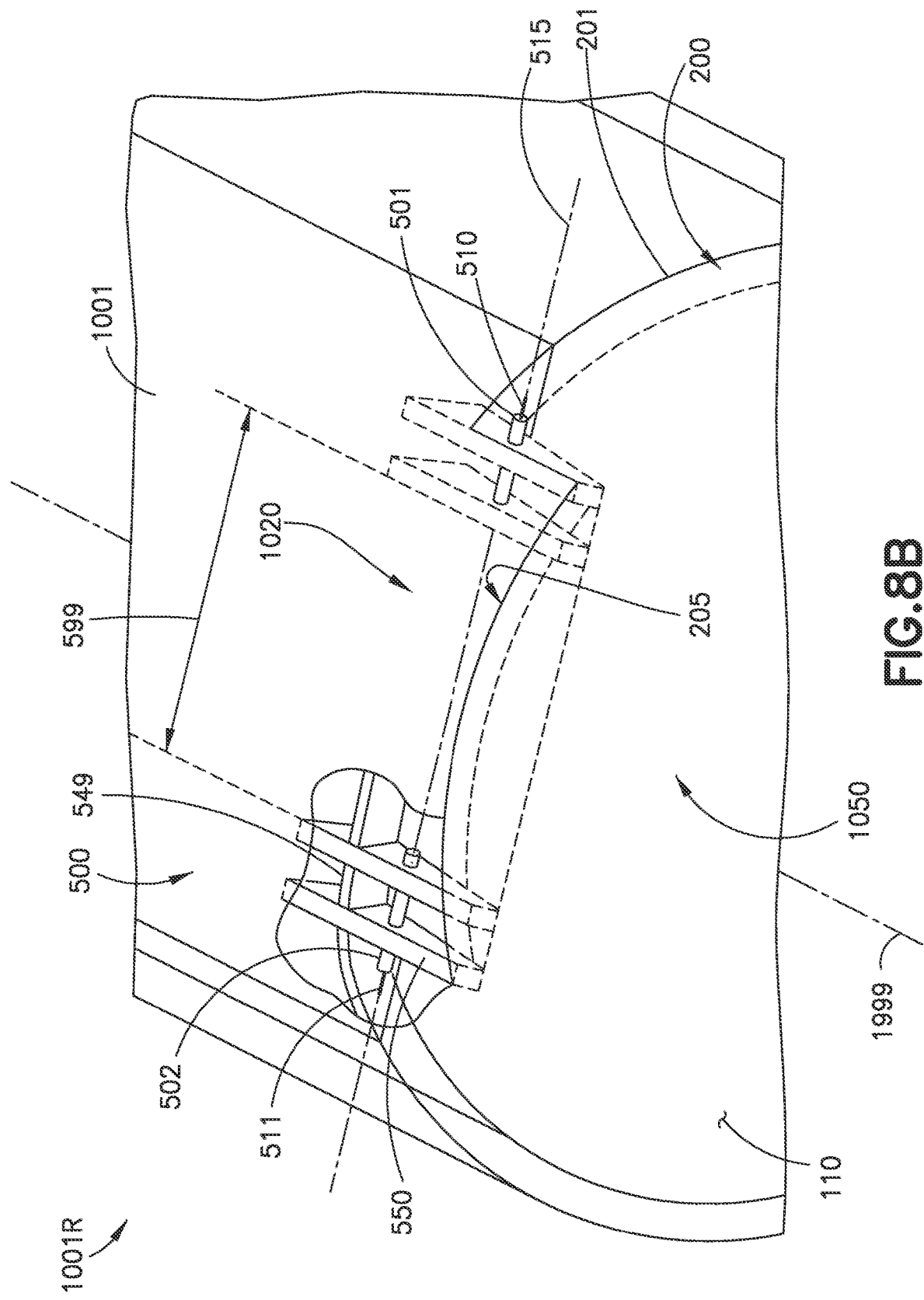
Figure 8C:
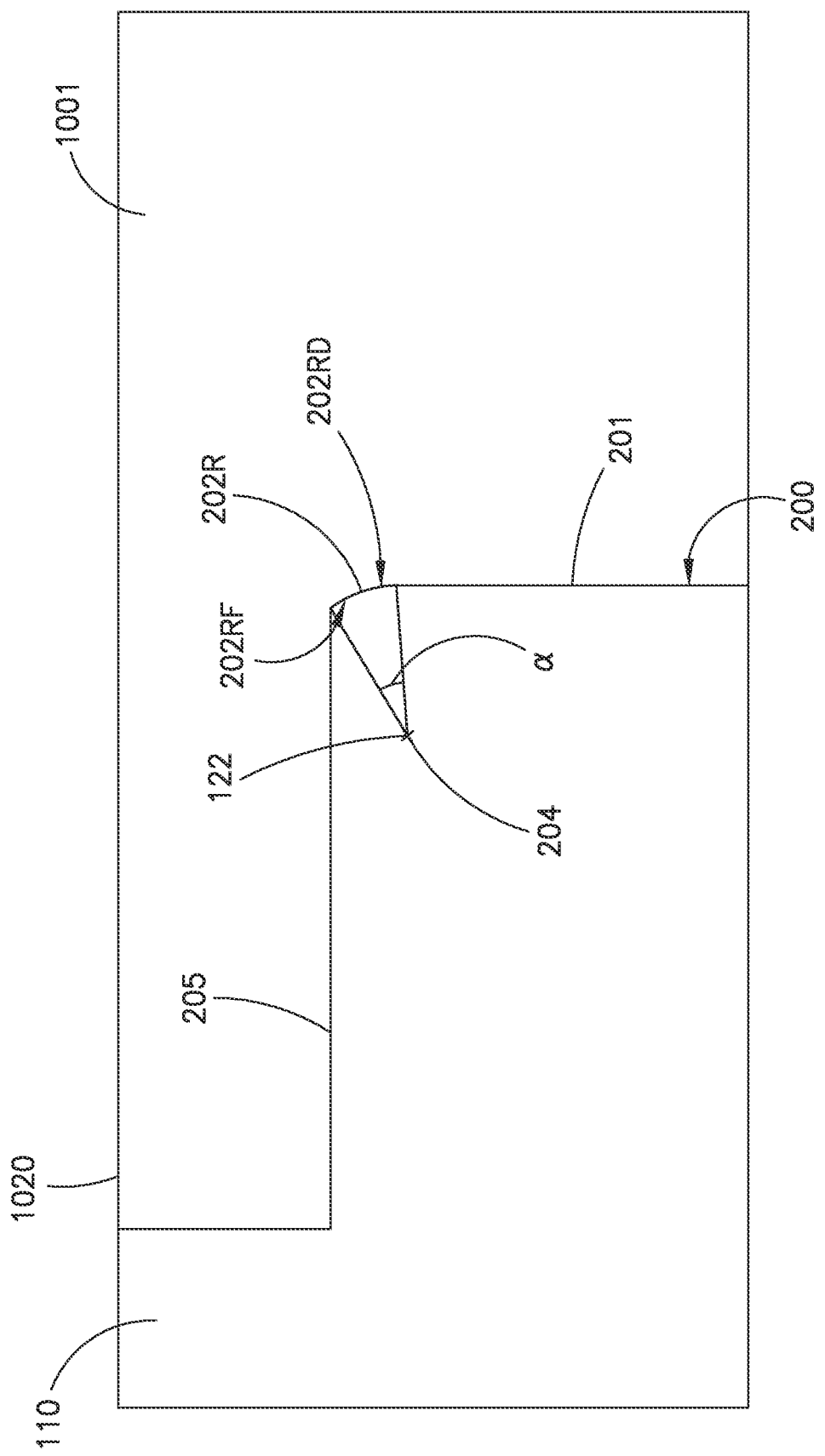
Figure 9:
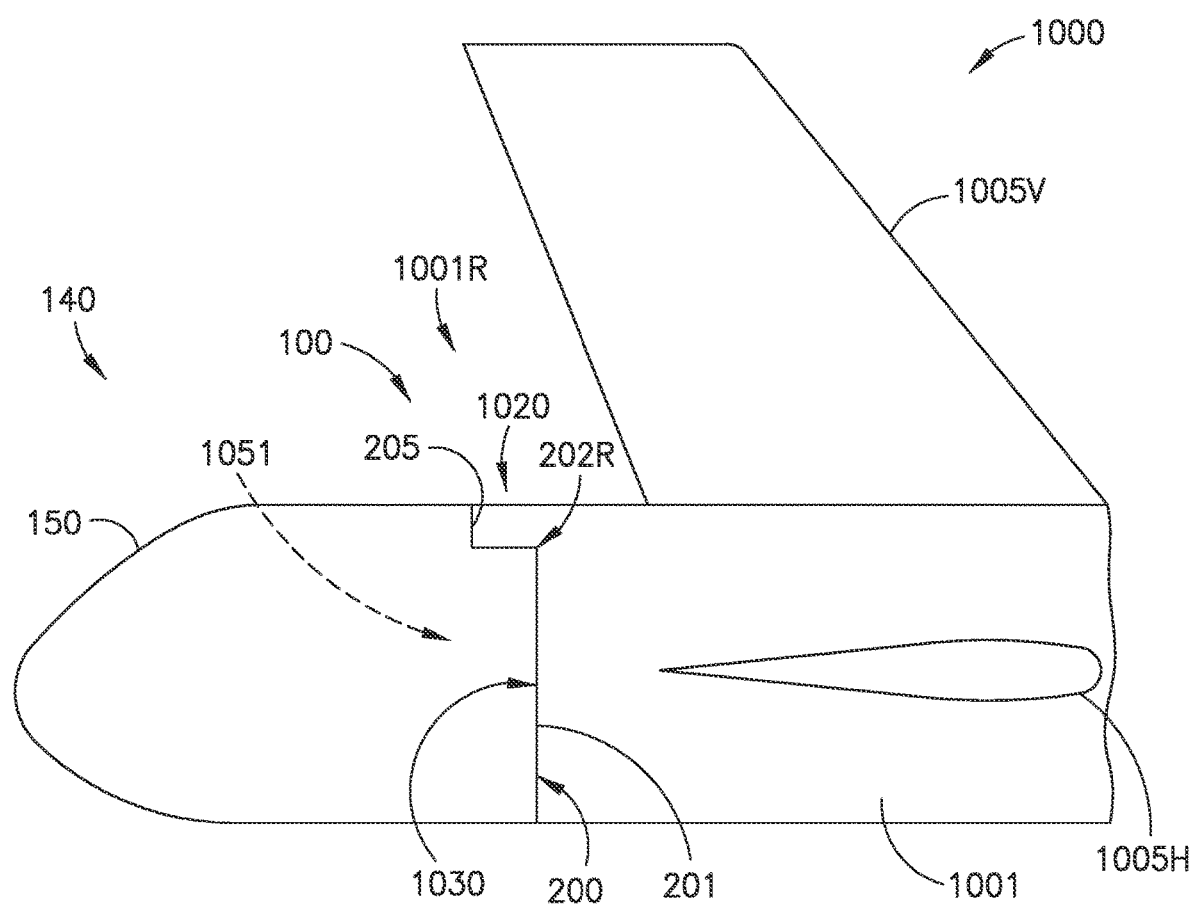
Figure 10:
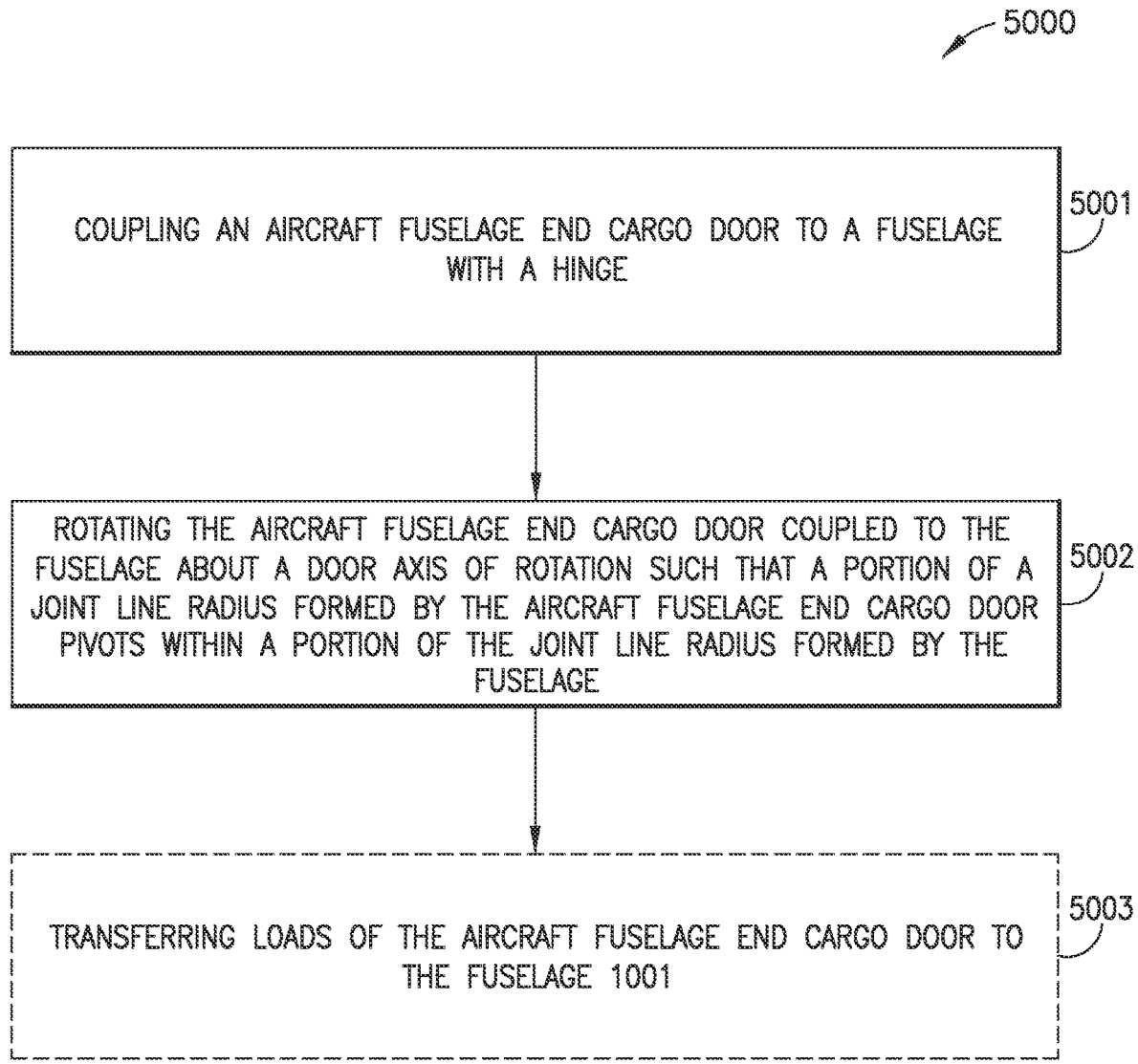
Figure 11:
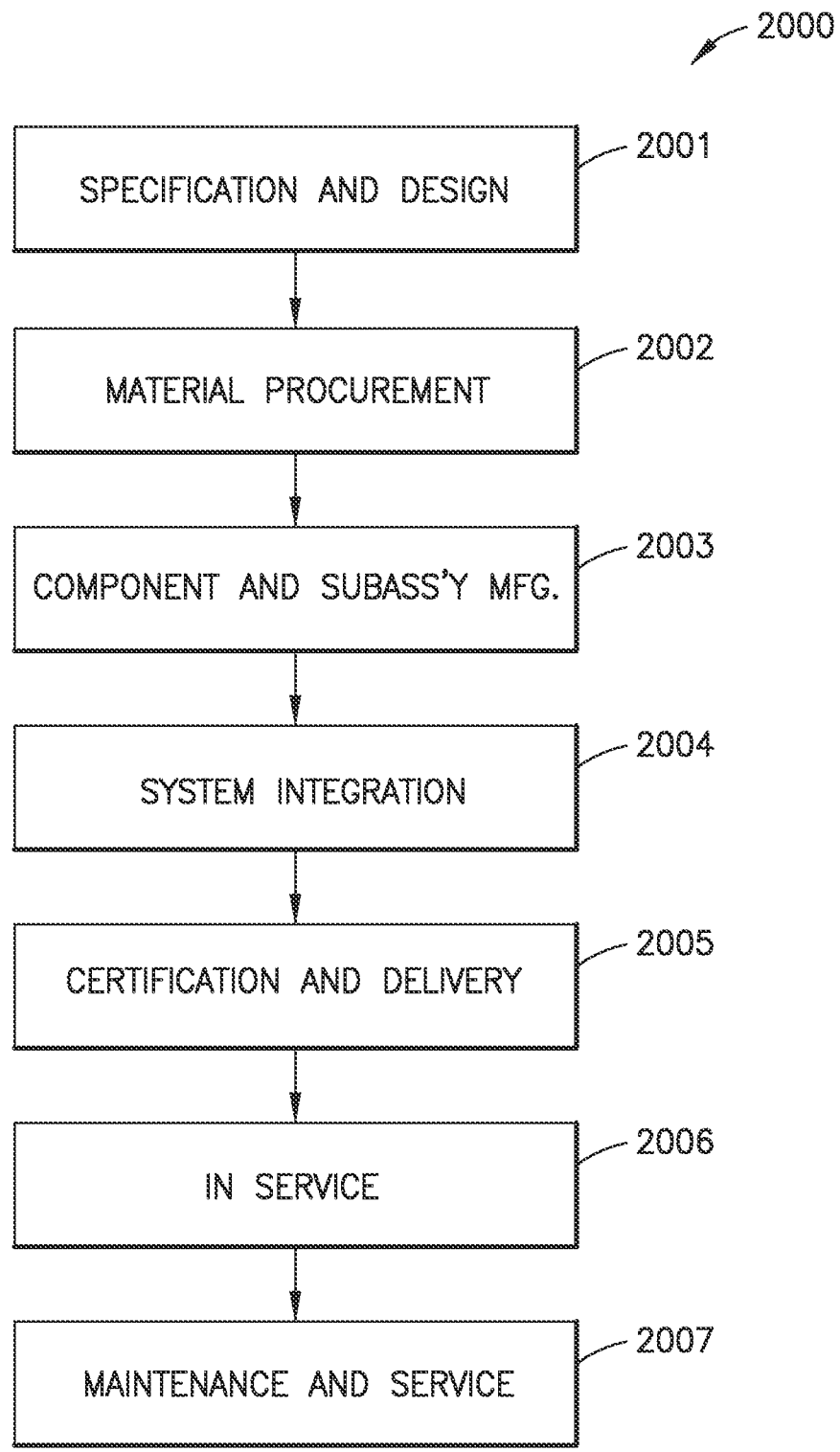

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a schematic side view illustration of an aircraft in accordance with one or more aspects of the present disclosure;

FIG. 1B is a schematic perspective view illustration of a portion of the aircraft in FIG. 1A;

FIG. 1C is a schematic perspective view illustration of a portion of the aircraft in FIG. 1A showing the opening to an interior cargo area of the aircraft with a nose cargo door removed for clarity;

FIG. 2 is a schematic side view illustration of a portion of the aircraft of FIG. 1 in accordance with one or more aspects of the present disclosure;

FIG. 3 is a schematic top view illustration of a portion of the aircraft of FIG. 1 in accordance with one or more aspects of the present disclosure;

FIG. 4 is a schematic side view illustration of a portion of the aircraft of FIG. 1 in accordance with one or more aspects of the present disclosure;

FIG. 5 is a schematic perspective view illustration an aircraft fuselage end cargo door mechanism in accordance with one or more aspects of the present disclosure;

FIG. 6 is a schematic side view illustration of a portion of the aircraft fuselage end cargo door mechanism of FIG. 5 in accordance with one or more aspects of the present disclosure;

FIGS. 7A-7D is a schematic side view illustration of an opening/closing sequence of the aircraft fuselage end cargo door mechanism of FIG. 5 in accordance with one or more aspects of the present disclosure;

FIG. 8A is a schematic perspective view illustration of a forward or nose portion of an aircraft in accordance with one or more aspects of the present disclosure;

FIG. 8B is a schematic perspective view illustration of the forward or nose portion of the aircraft of FIG. 8A in accordance with one or more aspects of the present disclosure;

FIG. 8C is a schematic side view illustration of the forward or nose portion of the aircraft of FIG. 8A in accordance with one or more aspects of the present disclosure;

FIG. 8D is a schematic side view illustration of the forward or nose portion of the aircraft of FIG. 8A in accordance with one or more aspects of the present disclosure;

FIG. 9 is a schematic side view illustration of an aft portion of an aircraft in accordance with one or more aspects of the present disclosure;

FIG. 10 is a block diagram of a method of use for the aircraft fuselage end cargo door mechanism 100 of FIG. 5 in accordance with one or more aspects of the present disclosure; and FIG. 11 is a block diagram of aircraft production and service methodology in accordance with one or more aspects of the present disclosure.

DETAILED DESCRIPTION

Referring to FIGS. 1A-1C, the aspects of the present disclosure described herein provide an aircraft fuselage end cargo door mechanism 100 and an aircraft 1000 including the aircraft fuselage end cargo door mechanism 100. The aircraft fuselage end cargo door mechanism 100 is configured so as to facilitate opening and closing of an aircraft fuselage end cargo door 110 without interfering with a fuselage 1001 of the aircraft 1000. The aircraft fuselage end cargo door mechanism 100 rotatably couples the aircraft fuselage end cargo door 110 to the fuselage 1001 of the aircraft 1000 such that the aircraft fuselage end cargo door 110 rotates freely without binding on the fuselage 1001 during opening and closing operations of the aircraft fuselage end cargo door 110, and without the need for corner hinge access door panels. Eliminating the corner hinge access door panels reduces the part count of the aircraft 1000, which reduces the cost and weight of the aircraft 1000, and may result in less maintenance downtime for the aircraft 1000. As will be described herein, when the aircraft fuselage end cargo door 110 rotates between an open position 198 (FIG. 2) and a closed position 199 (FIG. 1B), the aircraft fuselage end cargo door 110 rotates relative to the fuselage 1001, e.g., about 105 degrees (in some aspects the rotation may be more or less than about 105 degrees) to provide access to an interior cargo area 1006 of the aircraft 1000.

The aspects of the present disclosure will be described herein with respect to the aircraft 1000. The aircraft 1000 generally includes an airframe 1002 forming at least the fuselage 1001 which extends longitudinally along a longitudinal axis 1999 of the aircraft 1000. Located toward a forward portion 1001F of the fuselage 1001 is a cockpit 1003 (the cockpit 1003 including at least a windshield 1004) and a fuselage nose cone 1008. In one aspect, the forward portion 1001F of the fuselage 1001 may also include a projection 1020 extending beyond a forward end edge 1010 of the fuselage 1001. Located toward an aft portion 1001R of the fuselage 1001 are a vertical stabilizer 1005V, horizontal stabilizers 1005H, and a tail cone 140. The airframe 1002 further includes an aircraft skin 1002S disposed about the fuselage 1001 defining the interior cargo area 1006.

It should be understood that while the aircraft is depicted as a double-deck, wide body cargo freighter, such as, e.g., the Boeing 747-8F, designed for the transport of goods, the aircraft 1000 may be any aircraft including a single-deck aircraft, a narrow body aircraft, or any other suitable aircraft having an aircraft fuselage end cargo door 110 that forms at least a portion of the fuselage nose cone 1008 or tail cone 140. It should further be understood that while the aircraft fuselage end cargo door 110 is substantially described herein with respect to a nose cargo door 120 disposed at the forward portion 1001F of the aircraft 1000, the aircraft fuselage end cargo door 110 may form at least the fuselage nose cone 1008 (and in one aspect may include the cockpit 1003 and/or a portion of the fuselage 1001), the tail cone 140, or any other suitable portion of the aircraft 1000. In one aspect, the aircraft 1000 includes the nose cargo door 120 as illustrated in FIGS. 1A and 1B. In another aspect, the aircraft 1000 includes the tail cargo door 150 as illustrated in FIG. 9. In still other aspects, the aircraft 1000 includes both the nose cargo door 120 and the tail cargo door 150.

Referring to FIGS. 1A-1C, 8A, and 9, as noted above, in order to facilitate the loading and unloading of cargo from the interior cargo area 1006, the aircraft fuselage end cargo door 110 is coupled to one end (i.e., the forward portion 1001F or the aft portion 1001R) of the fuselage 1001 with the aircraft fuselage end cargo door mechanism 100. In one aspect, the aircraft fuselage end cargo door 110 is provided to seal an opening 1050 (see FIG. 1C) at the forward portion 1001F of the fuselage 1001 where the opening 1050 provides access to the interior cargo area 1006. In another aspects, the aircraft fuselage end cargo door 110 is provided to seal an opening 1051 (FIG. 9) at the aft portion 1001R of the fuselage 1001 where the opening 1051 provides access to the interior cargo area 1006. For example, the interior cargo area 1006 of the fuselage 1001 extends along the longitudinal axis 1999 of the aircraft 1000 between the forward portion 1001F and the aft portion 1001R and may at least in part form one or more of the openings 1050, 1051. In one aspect, a portion of the interior cargo area 1006 may be defined by the nose cargo door 120 or the tail cargo door 150. The nose cargo door 120 is configured to cover the opening 1050, enclosing the interior cargo area 1006 and sealing or otherwise closing the interior cargo area 1006 from an outside environment. Similarly, the tail cargo door 150 is configured to cover the opening 1051, enclosing the interior cargo area 1006 and sealing or otherwise closing the interior cargo area 1006 from an outside environment.

Referring to FIGS. 1B, 2, 3, and 4 in one aspect, the nose cargo door 120 includes a frame 120F (FIG. 4), an exterior skin 123, a forward tip 124, an aft edge 121, and surfaces 125A-125C, the surfaces 125A-125C defining a notched portion 125. Generally, the frame 120F and the exterior skin 123 of the nose cargo door 120 provide load-bearing capabilities. With the nose cargo door in a closed position 199, the exterior skin 123 is contoured to interface with the aircraft skin 1002S of the fuselage 1001 so as to unimpede the aerodynamics of the aircraft 1000. As seen best in FIG. 1B, in one aspect, with the nose cargo door 120 disposed at the forward portion 1001F of the aircraft 1000, the aft edge 121 of the nose cargo door 120 abuts the forward end edge 1010 of the fuselage 1001 and conforms to a perimeter 1010P of the forward end edge 1010. With the aft edge 121 of the nose cargo door 120 abutting the forward end edge 1010 of the fuselage 1001, the surfaces 125A-125C, defining the notched portion 125, abut the projection 1020 of the fuselage 1001. The aft edge 121 abutting the forward end edge 1010 and the surfaces 125A-125C abutting the projection 1020 define a joint line 200 between the nose cargo door 120 and the fuselage 1001. The nose cargo door 120 couples to the fuselage 1001 about the joint line 200 and is configured so as to be releasable to pivot, via the aircraft fuselage end cargo door mechanism 100, about a door axis of rotation 122 between the open position 198 and a closed position 199 for loading or unloading of cargo into and out of the interior cargo area 1006 of the aircraft 1000. In one aspect, the aircraft fuselage end cargo door mechanism 100 couples the nose cargo door 120, at the notched portion 125, to the projection 1020 of the fuselage 1001 such that the nose cargo door 120 rotates in direction 122D1 to the open position (FIG. 2) (i.e., the nose cargo door 120 opens such that the nose cargo door 120 is coupled to and is upheld by (so as to be at least partially above) the projection 1020 of the fuselage 1001).

As can be seen in FIGS. 1B and 3, the joint line 200 is generally divided into two parts, a major joint line 201 portion and a minor joint line 205 portion. The major joint line 201 is defined by the interface between the aft edge 121 of the nose cargo door 120 and the forward end edge 1010 of the fuselage 1001, each of which at least partially circumscribe the fuselage 1001 in a common plane CP (FIG. 1B), and excludes the minor joint line 205 portion of the joint line 200. The major joint line 201 includes an uppermost portion 202 forming a joint line radius 202R. The minor joint line 205 is defined by the interface between the surfaces 125A-125C of the notched portion 125 and the projection 1020. For example, when the nose cargo door 120 is closed, the notched portion 125 extends from the aft edge 121 towards the forward tip 124 of the nose cargo door 120 along the longitudinal axis 1999 of the aircraft 1000 (i.e., the surface 125A and the surface 125C extend along the longitudinal axis 1999 while surface 125B crosses (i.e., is traverse to) the longitudinal axis 1999). The notched portion 125 extends from the aft edge 121 a distance Z. The projection 1020 of the fuselage 1001 is configured to mate with the surfaces 125A-125C of the notched portion 125 such that each of the surfaces 125A-125C abuts a respective side 1020A, 1020C and front 1020B of the projection 1020. The notched portion 125 is configured such that when the nose cargo door 120 is rotated to the open position 198 (FIG. 2), the notched portion 125 may provide clearance for at least a portion of the fuselage 1001, such as, e.g., the windshield 1004 of the aircraft 1000.

Referring to FIGS. 1B and 4, while in a closed position 199, such as, when in flight, the nose cargo door 120 couples to the fuselage 1001, about the joint line 200, so that the interior cargo area 1006 is sealed from an outside atmosphere. With the nose cargo door 120 coupled to the fuselage 1001, a gap 129 is formed between the nose cargo door 120 and the fuselage 1001. In order to reduce aerodynamic impedances, the nose cargo door 120 includes at least one of a pressure seal 400 and an aerodynamic seal 401 disposed along the aft edge 121 of the nose cargo door 120 such that the at least one of a pressure seal 400 and an aerodynamic seal 401 seals the gap 129 formed around the perimeter of the joint line 200.

Referring to FIGS. 1B and 2, the nose cargo door 120 may further include an actuator 128 to drive the nose cargo door 120 between the open position 198 and closed position 199. Pivoting of the nose cargo door 120 to the open position 198 includes rotating or otherwise driving the nose cargo door 120, with the actuator 128, about the door axis of rotation 122 in direction 122D1. In one aspect, pivoting of the nose cargo door 120 from the open position 198 to the closed position 199 includes rotating or otherwise driving the nose cargo door 120, with the actuator 128 and/or under the impetus of gravity, about the door axis of rotation 122 in direction 122D2. In one aspect, the exterior skin 123 of the aircraft fuselage end cargo door 110, rotating about the door axis of rotation 122, forms an unarticulated monolithic surface.

Referring to now FIGS. 1A, 5, 6, and 7A-7D, the aircraft fuselage end cargo door mechanism 100 includes a hinge 300 rotatably coupling the aircraft fuselage end cargo door 110 to the fuselage 1001. The hinge 300 is coupled to both the aircraft fuselage end cargo door 110 and the fuselage 1001 so that the door axis of rotation 122 of the aircraft fuselage end cargo door 110, relative to the fuselage 1001, is located forward of the major joint line 201, where a hinge axis of rotation 350 of the hinge 300 defines the door axis of rotation 122. The hinge 300 may be a compact door hinge including a fuselage-side pivot mount 310 configured to couple with the fuselage 1001, and a door-side bracket 320 pivotally coupled to the fuselage-side pivot mount 310 by a bearing 330, the door-side bracket 320 configured to couple with the aircraft fuselage end cargo door 110.

The fuselage-side pivot mount 310 includes a surface 310S (which interfaces with a frame of the fuselage 1001) and attachment features 311-314 (see FIG. 6). In one aspect, the attachment features 311-314 of the fuselage-side pivot mount 310 are configured to couple the fuselage-side pivot mount 310 to the fuselage 1001. In one aspect, the attachment features 311-314 are apertures, through which any suitable fastener passes to secure the fuselage-side pivot mount 310 to any suitable structure of the fuselage 1001 such as, e.g., one or more of a bulkhead 549, stringers 550, or any other suitable structure of the airframe 1002 (see FIG. 8B). The fuselage-side pivot mount 310 further includes an aperture 315 (FIG. 6) extending along the hinge axis of rotation 350 and having a diameter X through which any suitable fastener 328 may pass to couple the fuselage-side pivot mount 310 and the door-side bracket 320. The hinge 300 is configured so that, when assembled to the fuselage 1001 and the aircraft fuselage end cargo door 110, the fuselage-side pivot mount 310 is at least partially located within an area 399, e.g., such as within a width 326 defined by the aft edge 121 of the aircraft fuselage end cargo door 110.

The door-side bracket 320 includes an arm 325 having a coupling surface 325S and a mounting member 327 having a mounting surface 327S. The coupling surface 325S of the arm 325 and the mounting surface 327S of the mounting member are configured to couple to any suitable structure of the aircraft fuselage end cargo door 110 so as to rotatably couple the aircraft fuselage end cargo door 110 to the airframe 1002 of the fuselage 1001. The door-side bracket 320 further includes an aperture 329 through which the door-side bracket 320 couples to the bearing 330 and the fastener 328. As noted above, the door-side bracket 320 is configured to pivot, via the bearing 330, relative to the fuselage-side pivot mount 310 about the hinge axis of rotation 350 in direction 390 a distance 300R, which distance 300R may be about 105 degrees (in some aspects the rotation may be more or less than about 105 degrees). In one aspect, the bearing 330 is a spherical bearing, while in other aspects, the bearing 330 is any suitable bearing to facilitate pivoting of the door-side bracket 320 with respect to the fuselage-side pivot mount 310 about the hinge axis of rotation 350. The spherical bearing may provide for unbinding rotation of the aircraft fuselage end cargo door 110 relative to the fuselage 1001 such under loading from wind impinging against the aircraft fuselage end cargo door 110, such as when the aircraft fuselage end cargo door 110 is being opened or closed with the aircraft 1000 parked at an airport.

As noted above, the hinge 300 defines the door axis of rotation 122 such that the hinge axis of rotation 350 of the hinge 300 and the door axis of rotation 122 are coaxial. The hinge axis of rotation 350 and door axis of rotation 122 are located forward of the major joint line 201 a distance 598 (FIGS. 3, 6, 7A) of at least about nine inches; while in other aspect, the distance 598 is between about nine inches and about twelve inches forward of the major joint line 201. In another aspect, the distance 598 may be any suitable distance less than about nine inches or more than about twelve inches. In one aspect, as illustrated in FIG. 3, a portion 205P of the minor joint line 205 adjacent the hinge 300 extends parallel to the longitudinal axis 1999 at least the distance 598 so that the aircraft fuselage end cargo door 110 does not bind on the fuselage 1001 during relative rotation of the nose cargo door 120 and the fuselage 1001; while in other aspects, the portion 205P of the minor joint line 205 may extend parallel to the longitudinal axis 1999 twice the distance of distance 598. In another aspect, the minor joint line 205 may extend parallel to the longitudinal axis 1999 any suitable distance so that the aircraft fuselage end cargo door 110 rotates freely (e.g., non-binding rotation) relative to the fuselage 1001.

Referring to FIGS. 7A-7D, in rotation of the aircraft fuselage end cargo door 110 relative to the fuselage 1001 without the aircraft fuselage end cargo door 110 binding on the fuselage 1001 is effected by the joint line radius 202R of the uppermost portion 202 of the major joint line 201. For example, the joint line radius 202R of the uppermost portion 202 of the major joint line 201 is configured to, at least in part, substantially prevent interference between the aircraft fuselage end cargo door 110 and the fuselage 1001. The joint line radius 202R includes a portion 202RD formed by the aircraft fuselage end cargo door 110 and a portion 202RF formed by the fuselage 1001. The portion 202RD of the joint line radius 202R formed by the aircraft fuselage end cargo door 110 is configured to pivot within the portion 202RF of the joint line radius 202R formed by the fuselage 1001. In one aspect, a radius of the joint line radius 202R is defined by the distance 598 such that the radius of the joint line radius 202R is substantially equal to the distance 598 that the axis of rotation 122 is spaced from the major joint line 201. Here, a center 203 of the joint line radius 202R is substantially co-located with the door axis of rotation 122 (and the hinge axis of rotation 350) of the aircraft fuselage end cargo door 110. In one aspect, an arc length L of the joint line radius 202R has a central angle α of about 45°, where the central angle α has a vertex 204 substantially co-located at the door axis of rotation 122 of the aircraft fuselage end cargo door 110 so that as the aircraft fuselage end cargo door 110 pivots, the portion 202RD of the aircraft fuselage end cargo door 110 does not bind on the portion 202RF of the fuselage 1001. In other aspects, the central angle α may be more or less than about 45°. For example, where the fuselage 1001 has an oval cross section (such as with the nose cargo door 120) at the major joint line 201 the central angle α may be about 45°. Where the fuselage 1001 has a circular cross section at the major joint line 201 (such as with a cargo door inclusive of the cockpit as illustrated in FIG. 8A) the central angle α may be about 30°.

In one aspect, the hinge 300 forms a load path configured to transfer door loads from a nose side 300N of the hinge 300 to a fuselage side 300F of the hinge 300 along a common axis (e.g., the axis of rotation 122). The hinge 300 provides increased stability, compared to goose-neck hinges that have a goose-neck shaped that pivots about the hinge axis of rotation and to which the door is coupled. For example, the load path created from the fuselage side 300F of the joint line 200 to the main body of the fuselage 1001 transfers door loads to the fuselage 1001 through the axis of rotation 122 without bending moments that would otherwise be induced by goose-neck shaped hinge linkages.

Referring to FIG. 8B, in another aspect, the aircraft fuselage end cargo door 110 is rotatably coupled to the fuselage 1001 with a pair of hinges 500 including a first hinge 501 and a second hinge 502. Each of the first hinge 501 and the second hinge 502 is substantially similar to the hinge 300 described above such that each hinge 501, 502 of the pair of hinges 500 couples to both the aircraft fuselage end cargo door 110 and the fuselage 1001 in the manner described with respect to hinge 300. In one aspect, the hinges 501, 502 of the pair of hinges 500 couple to one or more of a bulkhead 549, stringers 550, or any other suitable structure of the airframe 1002 in any suitable manner. The first hinge 501 of the pair of hinges 500 includes a first axis of rotation 510 and the second hinge 502 of the pair of hinges 500 includes a second axis of rotation 511. Each of the first and second axis of rotations 510, 511 are located forward of the major joint line 201 between the aircraft fuselage end cargo door 110 and the fuselage 1001 in the manner described above with respect to hinge 300. In one aspect, the first axis of rotation 510 and the second axis of rotation 511 are substantially coaxial with each other so as to form a common axis of rotation 515 of the aircraft fuselage end cargo door 110 which is substantially similar to the hinge axis of rotation 350 described above.

In one aspect, the first hinge 501 and the second hinge 502 are laterally spaced from each other, relative to a longitudinal axis 1999 of the fuselage 1001, so as to stably maintain rotation of the aircraft fuselage end cargo door 110 relative to the fuselage 1001. For example, the first hinge 501 and the second hinge 502 are laterally spaced from each other a distance 599 of between about seven feet and about eight feet to provide structural stability to the aircraft fuselage end cargo door 110. In another aspect, the distance 599 may be less than about seven feet or more than about eight feet, and such distance may depend on an aircraft configuration (e.g., wide body, narrow body, etc.).

In FIGS. 1A-3, the aircraft fuselage end cargo door 110 is illustrated as the nose cargo door 120 that includes the portion of the aircraft 1000 forward of the cockpit 1003 (e.g., fuselage nose cone 1008). Referring to FIGS. 1A and 8A-8D, in one aspect, the aircraft fuselage end cargo door 110 includes the cockpit 1003 and/or a portion of the fuselage 1001 that is disposed aft of the fuselage nose cone 1008. In this aspect, the joint line 200 is located a distance Y from, e.g., the forward end 700 of the aircraft 1000 such that the aircraft fuselage end cargo door 110 includes the cockpit 1003 and/or a portion of the fuselage 1001. In this aspect, the aircraft fuselage end cargo door 110 may have a circular loft or surface shape as seen in FIG. 8A, otherwise the aircraft fuselage end cargo door 110 is rotatably coupled to the fuselage 1001 as described above with respect to hinges 300, 500, 501. With the joint line 200 at the distance Y, the central angle α (FIGS. 8C and 8D) of joint line radius 202R may be about 30°, with a vertex 204 substantially co-located at the door axis of rotation 122 of the aircraft fuselage end cargo door 110. In other aspects, the central angle α may be more or less than about 30°. In this aspect, the aircraft fuselage end cargo door 110 may define a portion of the interior cargo area 1006 (i.e., cargo may be stored within the aircraft fuselage end cargo door 110). In another aspect, referring to FIG. 9, an aircraft fuselage end cargo door 110 may be located at the aft portion 1001R of the aircraft. In this aspect, the aft portion 1001R may include the projection 1020 extending beyond an aft end edge 1030 of the fuselage 1001 and the aircraft fuselage end cargo door 110 may be substantially similar to the aircraft fuselage end cargo door 110 described with respect to FIGS. 8A-8D.

Referring now to FIGS. 1A, 7A-7E, and 10, a method 5000 of use for the aircraft fuselage end cargo door mechanism 100 is illustrated. The aircraft fuselage end cargo door mechanism 100 is configured to couple the aircraft fuselage end cargo door 110 and the fuselage 1001 of the aircraft 1000, such that the aircraft fuselage end cargo door mechanism 100 rotates relative to the fuselage 1001 and loads of the aircraft fuselage end cargo door mechanism 100 are applied to the fuselage 1001 through the aircraft fuselage end cargo door mechanism 100.

As noted above, the aircraft fuselage end cargo door 110 is coupled to the fuselage 1001 with the hinge 300 a distance 598 from the major joint line 201 of the joint line 200 (FIG. 10, Block 5001). The aircraft fuselage end cargo door 110 coupled to the fuselage 1001 of the aircraft 1000 rotates about the door axis of rotation 122 in direction 122D such that the portion 202RD of the joint line radius 202R formed by the aircraft fuselage end cargo door 110 pivots within the portion 202RF of the joint line radius 202R formed by the fuselage 1001 (FIG. 10, Block 5002). As the portion 202RD of the joint line radius 202R formed by the aircraft fuselage end cargo door 110 pivots relative to the portion 202RF of the joint line radius 202R formed by the fuselage 1001, the portion 202RD of the joint line radius 202R formed by the aircraft fuselage end cargo door 110 does not bind or interfere with the portion 202RF of the joint line radius 202R formed by the fuselage 1001. As the aircraft fuselage end cargo door 110 pivots relative the fuselage 1001, the loads of the aircraft fuselage end cargo door 110 are transferred to the fuselage 1001 (FIG. 10, Block 5003).

Examples of the present disclosure may be described in the context of aircraft manufacturing and service method 2000 as shown in FIG. 11. In other aspects, the examples of the present disclosure may be applied in any suitable industry, such as e.g., automotive, maritime, aerospace, etc. With respect to aircraft manufacturing, during pre-production, illustrative method 2000 may include specification and design (Block 2001) of aircraft 1000 (FIG. 1A) and material procurement (Block 2002). During production, component and subassembly manufacturing (Block 2003) and system integration (Block 2004) of aircraft 1000 may take place. Thereafter, aircraft 1000 may go through certification and delivery (Block 2005) to be placed in service (Block 2006). While in service, aircraft 1000 may be scheduled for routine maintenance and service (Block 2007). Routine maintenance and service may include modification, reconfiguration, refurbishment, etc. of one or more systems of aircraft 1000 which may include the aircraft fuselage end cargo door mechanism 100 as described herein.

Each of the processes of illustrative method 2000 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of the manufacturing and service method 2000. For example, components or subassemblies corresponding to component and subassembly manufacturing (Block 2003) may be fabricated or manufactured in a manner similar to components or subassemblies produced while aircraft 1000 is in service (Block 2006). Also, one or more examples of the apparatus(es), method(s), or combination thereof may be utilized during production stages 2003 and 2004, for example, by substantially expediting assembly of or reducing the cost of aircraft 1000. Similarly, one or more examples of the apparatus or method realizations, or a combination thereof, may be utilized, for example and without limitation, while aircraft 1000 is in service (Block 2006) and/or during maintenance and service (Block 2007).

The following are provided in accordance with the aspects of the present disclosure:

A1. An aircraft fuselage end cargo door mechanism comprising:
a hinge rotatably coupling an aircraft fuselage end cargo door to a fuselage, the hinge being coupled to both the aircraft fuselage end cargo door and the fuselage so that an axis of rotation of the aircraft fuselage end cargo door, defined by the hinge, relative to the fuselage is located forward of a major joint line between the aircraft fuselage end cargo door and the fuselage;
wherein an uppermost portion of the major joint line comprises a joint line radius where a portion of the joint line radius formed by the aircraft fuselage end cargo door pivots within another portion of the joint line radius formed by the fuselage.

A2. The aircraft fuselage end cargo door mechanism of paragraph A1, wherein a center of the joint line radius is substantially co-located with the axis of rotation of the aircraft fuselage end cargo door.

A3. The aircraft fuselage end cargo door mechanism of paragraph A1, wherein an arc length of the joint line radius has a central angle of about 45° or about 30°, where the central angle has a vertex substantially co-located at the axis of rotation of the aircraft fuselage end cargo door.

A4. The aircraft fuselage end cargo door mechanism of paragraph A1, comprising a second hinge rotatably coupling the aircraft fuselage end cargo door to the fuselage, the second hinge being coupled to both the aircraft fuselage end cargo door and the fuselage so that a second axis of rotation of the aircraft fuselage end cargo door, defined by the second hinge, relative to the fuselage is located forward of a major joint line between the aircraft fuselage end cargo door and the fuselage.

A5. The aircraft fuselage end cargo door mechanism of paragraph A4, wherein the axis of rotation and the second axis of rotation are substantially coincident with each other so as to form a common axis of rotation of the aircraft fuselage end cargo door.

A6. The aircraft fuselage end cargo door mechanism of paragraph A4, wherein the hinge and the second hinge are laterally spaced from each other, relative to a longitudinal axis of the fuselage, so as to stably maintain rotation of the aircraft fuselage end cargo door relative to the fuselage.

A7. The aircraft fuselage end cargo door mechanism of paragraph A6, wherein the hinge and the second hinge are laterally spaced from each other a distance of between about seven feet and about eight feet.

A8. The aircraft fuselage end cargo door mechanism of paragraph A1, wherein the hinge forms a load path configured to transfer door loads from a nose side of the hinge to a fuselage side of the hinge.

A9. The aircraft fuselage end cargo door mechanism of paragraph A1, wherein the axis of rotation of the aircraft fuselage end cargo door is located at least about nine inches forward of the major joint line.

A10. The aircraft fuselage end cargo door mechanism of paragraph A1, wherein the axis of rotation of the aircraft fuselage end cargo door is located between about nine inches and about twelve inches forward of the major joint line.

A11. The aircraft fuselage end cargo door mechanism of paragraph A1, wherein a skin of the aircraft fuselage end cargo door, rotating about the axis of rotation, forms an unarticulated monolithic surface.

A12. The aircraft fuselage end cargo door mechanism of paragraph A1, wherein the hinge comprises:
a fuselage-side pivot mount configured to couple with the fuselage; and
a door-side bracket configured to couple with the aircraft fuselage end cargo door;
wherein the door-side bracket is pivotally coupled to the fuselage-side pivot mount by a bearing.

A13. The aircraft fuselage end cargo door mechanism of paragraph A12, wherein the bearing is a spherical bearing.

A14. The aircraft fuselage end cargo door mechanism of paragraph A12, wherein the hinge is configured so that, when assembled to the fuselage and aircraft fuselage end cargo door, the fuselage-side pivot mount is located within an area defined by an edge of the aircraft fuselage end cargo door.

A15. The aircraft fuselage end cargo door mechanism of paragraph A1, wherein the aircraft fuselage end cargo door comprises one or more of a nose cargo door and a tail cargo door.

A16. The aircraft fuselage end cargo door mechanism of paragraph A15, wherein the nose cargo door comprises a cockpit area.

A17. The aircraft fuselage end cargo door mechanism of paragraph A1, wherein the fuselage end cargo door comprises a fuselage nose cone.

A18. The aircraft fuselage end cargo door mechanism of paragraph A1, wherein the fuselage end cargo door comprises a fuselage tail cone.

B1. An aircraft fuselage end cargo door mechanism comprising:
a pair of hinges rotatably coupling an aircraft fuselage end cargo door to a fuselage, the pair of hinges being coupled to both the aircraft fuselage end cargo door and the fuselage; and
a common axis of rotation defined by the pair of hinges, where
the aircraft fuselage end cargo door rotates relative to the fuselage about the common axis of rotation, and
the common axis of rotation is located forward of a major joint line between the aircraft fuselage end cargo door and the fuselage;
wherein a skin of the aircraft fuselage end cargo door, rotating about the common axis of rotation, forms an unarticulated monolithic surface and a skin of the fuselage adjacent major joint line is unarticulated.

B2. The aircraft fuselage end cargo door mechanism of paragraph B1, wherein an uppermost portion of the major joint line comprises a joint line radius where a portion of the joint line radius formed by the aircraft fuselage end cargo door pivots within another portion of the joint line radius formed by the fuselage.

B3. The aircraft fuselage end cargo door mechanism of paragraph B2, wherein a center of the joint line radius is substantially co-located with the common axis of rotation.

B4. The aircraft fuselage end cargo door mechanism of paragraph B2, wherein an arc length of the joint line radius has a central angle of about 45° or about 30°, where the central angle has a vertex substantially co-located at the common axis of rotation.

B5. The aircraft fuselage end cargo door mechanism of paragraph B1, wherein one hinge of the pair of hinges is laterally spaced from another hinge in the pair of hinges, relative to a longitudinal axis of the fuselage, so as to stably maintain rotation of the aircraft fuselage end cargo door relative to the fuselage.

B6. The aircraft fuselage end cargo door mechanism of paragraph B5, wherein one hinge of the pair of hinges is laterally spaced from another hinge of the pair of hinges a distance of between about seven feet and about eight feet.

B7. The aircraft fuselage end cargo door mechanism of paragraph B1, wherein each hinge of the pair of hinges form a respective load path configured to transfer door loads from a nose side of the hinge to a fuselage side of the hinge.

B8. The aircraft fuselage end cargo door mechanism of paragraph B1, wherein the common axis of rotation is located at least about nine inches forward of the major joint line.

B9. The aircraft fuselage end cargo door mechanism of paragraph B1, wherein the common axis of rotation is located between about nine inches and about twelve inches forward of the major joint line.

B10. The aircraft fuselage end cargo door mechanism of paragraph B1, wherein each hinge of the pair of hinges comprises:
- a fuselage-side pivot mount configured to couple with the fuselage; and
- a door-side bracket configured to couple with the aircraft fuselage end cargo door;
- wherein the door-side bracket is pivotally coupled to the fuselage-side pivot mount by a bearing.

B11. The aircraft fuselage end cargo door mechanism of paragraph B10, wherein the bearing is a spherical bearing.

B12. The aircraft fuselage end cargo door mechanism of paragraph B10, wherein each hinge of the pair of hinges is configured so that, when assembled to the fuselage and aircraft fuselage end cargo door, the fuselage-side pivot mount is located within an area defined by an edge of the aircraft fuselage end cargo door.

B13. The aircraft fuselage end cargo door mechanism of paragraph B1, wherein the aircraft fuselage end cargo door comprises one or more of a nose cargo door and a tail cargo door.

B14. The aircraft fuselage end cargo door mechanism of paragraph B13, wherein the nose cargo door comprises a cockpit area.

B15. The aircraft fuselage end cargo door mechanism of paragraph B1, wherein the fuselage end cargo door comprises a fuselage nose cone.

B16. The aircraft fuselage end cargo door mechanism of paragraph B1, wherein the fuselage end cargo door comprises a fuselage tail cone.

C1. An aircraft fuselage end cargo door mechanism comprising:
- a hinge rotatably coupling an aircraft fuselage end cargo door to a fuselage, the hinge being coupled to both the aircraft fuselage end cargo door and the fuselage so as to form an axis of rotation of the aircraft fuselage end cargo door; and
- a major joint line defined by an interface between the aircraft fuselage end cargo door and the fuselage, the axis of rotation of the aircraft fuselage end cargo door being located forward of the major joint line;
- wherein a skin of the aircraft fuselage end cargo door, rotating about the axis of rotation, forms an unarticulated monolithic surface and a skin of the fuselage adjacent major joint line is unarticulated.

C2. The aircraft fuselage end cargo door mechanism of paragraph C1, wherein an uppermost portion of the major joint line comprises a joint line radius where a portion of the joint line radius formed by the aircraft fuselage end cargo door pivots within another portion of the joint line radius formed by the fuselage.

C3. The aircraft fuselage end cargo door mechanism of paragraph C2, wherein a center of the joint line radius is substantially co-located with the axis of rotation of the aircraft fuselage end cargo door.

C4. The aircraft fuselage end cargo door mechanism of paragraph C2, wherein an arc length of the joint line radius has a central angle of about 45° or about 30°, where the central angle has a vertex substantially co-located at the axis of rotation of the aircraft fuselage end cargo door.

C5. The aircraft fuselage end cargo door mechanism of paragraph C1, comprising a second hinge rotatably coupling the aircraft fuselage end cargo door to the fuselage, the second hinge being coupled to both the aircraft fuselage end cargo door and the fuselage so as to form a second axis of rotation of the aircraft fuselage end cargo door.

C6. The aircraft fuselage end cargo door mechanism of paragraph C5, wherein the axis of rotation and the second axis of rotation are substantially coincident with each other so as to form a common axis of rotation of the aircraft fuselage end cargo door.

C7. The aircraft fuselage end cargo door mechanism of paragraph C5, wherein the hinge and the second hinge are laterally spaced from each other, relative to a longitudinal axis of the fuselage, so as to stably maintain rotation of the aircraft fuselage end cargo door relative to the fuselage.

C8. The aircraft fuselage end cargo door mechanism of paragraph C7, wherein the hinge and the second hinge are laterally spaced from each other a distance of between about seven feet and about eight feet.

C9. The aircraft fuselage end cargo door mechanism of paragraph C1, wherein the hinge forms a load path configured to transfer door loads from a nose side of the hinge to a fuselage side of the hinge.

C10. The aircraft fuselage end cargo door mechanism of paragraph C1, wherein the axis of rotation of the aircraft fuselage end cargo door is located at least about nine inches forward of the major joint line.

C11. The aircraft fuselage end cargo door mechanism of paragraph C1, wherein the axis of rotation of the aircraft fuselage end cargo door is located between about nine inches and about twelve inches forward of the major joint line.

C12. The aircraft fuselage end cargo door mechanism of paragraph C1, wherein the hinge comprises:
- a fuselage-side pivot mount configured to couple with the fuselage; and
- a door-side bracket configured to couple with the aircraft fuselage end cargo door;
- wherein the door-side bracket is pivotally coupled to the fuselage-side pivot mount by a bearing.

C13. The aircraft fuselage end cargo door mechanism of paragraph C12, wherein the bearing is a spherical bearing.

C14. The aircraft fuselage end cargo door mechanism of paragraph C12, wherein the hinge is configured so that, when assembled to the fuselage and aircraft fuselage end cargo door, the fuselage-side pivot mount is located within an area defined by an edge of the aircraft fuselage end cargo door.

C15. The aircraft fuselage end cargo door mechanism of paragraph C1, wherein the aircraft fuselage end cargo door comprises one or more of a nose cargo door and a tail cargo door.

C16. The aircraft fuselage end cargo door mechanism of paragraph C15, wherein the nose cargo door comprises a cockpit area.

C17. The aircraft fuselage end cargo door mechanism of paragraph C1, wherein the fuselage end cargo door comprises a fuselage nose cone.

C18. The aircraft fuselage end cargo door mechanism of paragraph C1, wherein the fuselage end cargo door comprises a fuselage tail cone.

D1. An aircraft comprising:
  a fuselage;
  an aircraft fuselage end cargo door, wherein the aircraft fuselage end cargo door couples to the fuselage at a major joint line; and
  a fuselage end cargo door mechanism comprising:
    a hinge rotatably coupling the aircraft fuselage end cargo door to the fuselage, the hinge being coupled to both the aircraft fuselage end cargo door and the fuselage so that an axis of rotation of the aircraft fuselage end cargo door, defined by the hinge, relative to the fuselage is located forward of the major joint line between the aircraft fuselage end cargo door and the fuselage;
    wherein an uppermost portion of the major joint line comprises a joint line radius where a portion of the joint line radius formed by the aircraft fuselage end cargo door pivots within another portion of the joint line radius formed by the fuselage.

D2. The aircraft of paragraph D1, wherein a center of the joint line radius is substantially co-located with the axis of rotation of the aircraft fuselage end cargo door.

D3. The aircraft of paragraph D1, wherein an arc length of the joint line radius has a central angle of about 45° or about 30°, where the central angle has a vertex substantially co-located at the axis of rotation of the aircraft fuselage end cargo door.

D4. The aircraft of paragraph D1, comprising a second hinge rotatably coupling the aircraft fuselage end cargo door to the fuselage, the second hinge being coupled to both the aircraft fuselage end cargo door and the fuselage so that a second axis of rotation of the aircraft fuselage end cargo door, defined by the second hinge, relative to the fuselage is located forward of a major joint line between the aircraft fuselage end cargo door and the fuselage.

D5. The aircraft of paragraph D4, wherein the axis of rotation and the second axis of rotation are substantially coincident with each other so as to form a common axis of rotation of the aircraft fuselage end cargo door.

D6. The aircraft of paragraph D4, wherein the hinge and the second hinge are laterally spaced from each other, relative to a longitudinal axis of the fuselage, so as to stably maintain rotation of the aircraft fuselage end cargo door relative to the fuselage.

D7. The aircraft of paragraph D6, wherein the hinge and the second hinge are laterally spaced from each other a distance of between about seven feet and about eight feet.

D8. The aircraft of paragraph D1, wherein the hinge forms a load path configured to transfer door loads from a nose side of the hinge to a fuselage side of the hinge.

D9. The aircraft of paragraph D1, wherein the axis of rotation of the aircraft fuselage end cargo door is located at least about nine inches forward of the major joint line.

D10. The aircraft of paragraph D1, wherein the axis of rotation of the aircraft fuselage end cargo door is located between about nine inches and about twelve inches forward of the major joint line.

D11. The aircraft of paragraph D1, wherein a skin of the aircraft fuselage end cargo door, rotating about the axis of rotation, forms an unarticulated monolithic surface.

D12. The aircraft of paragraph D1, wherein the hinge comprises:
  a fuselage-side pivot mount configured to couple with the fuselage; and
  a door-side bracket configured to couple with the aircraft fuselage end cargo door;
  wherein the door-side bracket is pivotally coupled to the fuselage-side pivot mount by a bearing.

D13. The aircraft fuselage end cargo door mechanism of paragraph A12, wherein the bearing is a spherical bearing.

D14. The aircraft of paragraph D12, wherein the hinge is configured so that, when assembled to the fuselage and aircraft fuselage end cargo door, the fuselage-side pivot mount is located within an area defined by an edge of the aircraft fuselage end cargo door.

D15. The aircraft of paragraph D1, wherein the aircraft fuselage end cargo door comprises one or more of a nose cargo door and a tail cargo door.

D16. The aircraft of paragraph D15, wherein the nose cargo door comprises a cockpit area.

D17. The aircraft of paragraph D1, wherein the aircraft fuselage end cargo door comprises a fuselage nose cone.

D18. The aircraft of paragraph D1, wherein the aircraft fuselage end cargo door comprises a fuselage tail cone.

E1. An aircraft comprising:
  a fuselage;
  an aircraft fuselage end cargo door, wherein the aircraft fuselage end cargo door couples to the fuselage at a major joint line; and
  an aircraft fuselage end cargo door mechanism comprising:
    a pair of hinges rotatably coupling the aircraft fuselage end cargo door to the fuselage, the pair of hinges being coupled to both the aircraft fuselage end cargo door and the fuselage; and
    a common axis of rotation defined by the pair of hinges, where
    the aircraft fuselage end cargo door rotates relative to the fuselage about the common axis of rotation, and
    the common axis of rotation is located forward of the major joint line between the aircraft fuselage end cargo door and the fuselage;
    wherein a skin of the aircraft fuselage end cargo door, rotating about the common axis of rotation, forms an unarticulated monolithic surface and a skin of the fuselage adjacent major joint line is unarticulated.

E2. The aircraft of paragraph E1, wherein an uppermost portion of the major joint line comprises a joint line radius where a portion of the joint line radius formed by the aircraft fuselage end cargo door pivots within another portion of the joint line radius formed by the fuselage.

E3. The aircraft of paragraph E2, wherein a center of the joint line radius is substantially co-located with the common axis of rotation.

E4. The aircraft of paragraph E2, wherein an arc length of the joint line radius has a central angle of about 45° or about 30°, where the central angle has a vertex substantially co-located at the common axis of rotation.

E5. The aircraft of paragraph E1, wherein one hinge of the pair of hinges is laterally spaced from another hinge in the pair of hinges, relative to a longitudinal axis of the fuselage, so as to stably maintain rotation of the aircraft fuselage end cargo door relative to the fuselage.

E6. The aircraft of paragraph E5, wherein one hinge of the pair of hinges is laterally spaced from another hinge of the pair of hinges a distance of between about seven feet and about eight feet.

E7. The aircraft of paragraph E1, wherein each hinge of the pair of hinges form a respective load path configured to transfer door loads from a nose side of the hinge to a fuselage side of the hinge.

E8. The aircraft of paragraph E1, wherein the common axis of rotation is located at least about nine inches forward of the major joint line.

E9. The aircraft of paragraph E1, wherein the common axis of rotation is located between about nine inches and about twelve inches forward of the major joint line.

E10. The aircraft of paragraph E1, wherein each hinge of the pair of hinges comprises:
   a fuselage-side pivot mount configured to couple with the fuselage; and
   a door-side bracket configured to couple with the aircraft fuselage end cargo door;
   wherein the door-side bracket is pivotally coupled to the fuselage-side pivot mount by a bearing.

E11. The aircraft of paragraph E10, wherein the bearing is a spherical bearing.

E12. The aircraft of paragraph E10, wherein each hinge of the pair of hinges is configured so that, when assembled to the fuselage and aircraft fuselage end cargo door, the fuselage-side pivot mount is located within an area defined by an edge of the aircraft fuselage end cargo door.

E13. The aircraft of paragraph E1, wherein the aircraft fuselage end cargo door comprises one or more of a nose cargo door and a tail cargo door.

E14. The aircraft of paragraph E13, wherein the nose cargo door comprises a cockpit area.

E15. The aircraft of paragraph E1, wherein the aircraft fuselage end cargo door comprises a fuselage nose cone.

E16. The aircraft of paragraph E1, wherein the aircraft fuselage end cargo door comprises a fuselage tail cone.

F1. An aircraft comprising:
   a fuselage;
   an aircraft fuselage end cargo door configured to interface with the fuselage; and
   an aircraft fuselage end cargo door mechanism comprising:
      a hinge rotatably coupling the aircraft fuselage end cargo door to the fuselage, the hinge being coupled to both the aircraft fuselage end cargo door and the fuselage so as to form an axis of rotation of the aircraft fuselage end cargo door; and
      a major joint line defined by the interface between the aircraft fuselage end cargo door and the fuselage, the axis of rotation of the aircraft fuselage end cargo door being located forward of the major joint line;
   wherein a skin of the aircraft fuselage end cargo door, rotating about the axis of rotation, forms an unarticulated monolithic surface and a skin of the fuselage adjacent major joint line is unarticulated.

F2. The aircraft of paragraph F1, wherein an uppermost portion of the major joint line comprises a joint line radius where a portion of the joint line radius formed by the aircraft fuselage end cargo door pivots within another portion of the joint line radius formed by the fuselage.

F3. The aircraft of paragraph F2, wherein a center of the joint line radius is substantially co-located with the axis of rotation of the aircraft fuselage end cargo door.

F4. The aircraft of paragraph F2, wherein an arc length of the joint line radius has a central angle of about 45° or about 30°, where the central angle has a vertex substantially co-located at the axis of rotation of the aircraft fuselage end cargo door.

F5. The aircraft of paragraph F1, comprising a second hinge rotatably coupling the aircraft fuselage end cargo door to the fuselage, the second hinge being coupled to both the aircraft fuselage end cargo door and the fuselage so as to form a second axis of rotation of the aircraft fuselage end cargo door.

F6. The aircraft of paragraph F5, wherein the axis of rotation and the second axis of rotation are substantially coincident with each other so as to form a common axis of rotation of the aircraft fuselage end cargo door.

F7. The aircraft of paragraph F5, wherein the hinge and the second hinge are laterally spaced from each other, relative to a longitudinal axis of the fuselage, so as to stably maintain rotation of the aircraft fuselage end cargo door relative to the fuselage.

F8. The aircraft of paragraph F7, wherein the hinge and the second hinge are laterally spaced from each other a distance of between about seven feet and about eight feet.

F9. The aircraft of paragraph F1, wherein the hinge forms a load path configured to transfer door loads from a nose side of the hinge to a fuselage side of the hinge.

F10. The aircraft of paragraph F1, wherein the axis of rotation of the aircraft fuselage end cargo door is located at least about nine inches forward of the major joint line.

F11. The aircraft of paragraph F1, wherein the axis of rotation of the aircraft fuselage end cargo door is located between about nine inches and about twelve inches forward of the major joint line.

F12. The aircraft of paragraph F1, wherein the hinge comprises:
   a fuselage-side pivot mount configured to couple with the fuselage; and
   a door-side bracket configured to couple with the aircraft fuselage end cargo door;
   wherein the door-side bracket is pivotally coupled to the fuselage-side pivot mount by a bearing.

F13. The aircraft of paragraph F12, wherein the bearing is a spherical bearing.

F14. The aircraft of paragraph F12, wherein the hinge is configured so that, when assembled to the fuselage and aircraft fuselage end cargo door, the fuselage-side pivot mount is located within an area defined by an edge of the aircraft fuselage end cargo door.

F15. The aircraft of paragraph F1, wherein the aircraft fuselage end cargo door comprises one or more of a nose cargo door and a tail cargo door.

F16. The aircraft of paragraph F15, wherein the nose cargo door comprises a cockpit area.

F17. The aircraft of paragraph F1, wherein the fuselage end cargo door comprises a fuselage nose cone.

F18. The aircraft of paragraph F1, wherein the fuselage end cargo door comprises a fuselage tail cone.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 10 and 11, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 10 and 11 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An aircraft fuselage end cargo door mechanism comprising:
    a hinge rotatably coupling an aircraft fuselage end cargo door to a fuselage, the hinge being coupled to both the aircraft fuselage end cargo door and the fuselage so that an entirety of an axis of rotation of the aircraft fuselage end cargo door, defined by the hinge, relative to the fuselage is located forward of an entirety of a major joint line between the aircraft fuselage end cargo door and the fuselage;
    wherein an uppermost portion of the major joint line comprises a joint line radius where a portion of the joint line radius formed by the aircraft fuselage end cargo door pivots within another portion of the joint line radius formed by the fuselage.

2. The aircraft fuselage end cargo door mechanism of claim 1, wherein a center of the joint line radius is substantially co-located with the axis of rotation of the aircraft fuselage end cargo door.

3. The aircraft fuselage end cargo door mechanism of claim 1, wherein an arc length of the joint line radius has a central angle of about 45° or about 30°, where the central angle has a vertex substantially co-located at the axis of rotation of the aircraft fuselage end cargo door.

4. The aircraft fuselage end cargo door mechanism of claim 1, comprising a second hinge rotatably coupling the aircraft fuselage end cargo door to the fuselage, the second hinge being coupled to both the aircraft fuselage end cargo door and the fuselage so that an entirety of a second axis of rotation of the aircraft fuselage end cargo door, defined by the second hinge, relative to the fuselage is located forward of an entirety of the major joint line between the aircraft fuselage end cargo door and the fuselage.

5. The aircraft fuselage end cargo door mechanism of claim 4, wherein the axis of rotation and the second axis of rotation are substantially coincident with each other so as to form a common axis of rotation of the aircraft fuselage end cargo door.

6. The aircraft fuselage end cargo door mechanism of claim 4, wherein the hinge and the second hinge are laterally spaced from each other, relative to a longitudinal axis of the fuselage, so as to stably maintain rotation of the aircraft fuselage end cargo door relative to the fuselage.

7. The aircraft fuselage end cargo door mechanism of claim 1, wherein the hinge forms a load path configured to transfer door loads from a nose side of the hinge to a fuselage side of the hinge.

8. The aircraft fuselage end cargo door mechanism of claim 1, wherein the hinge comprises:
   a fuselage-side pivot mount configured to couple with the fuselage; and
   a door-side bracket configured to couple with the aircraft fuselage end cargo door;
   wherein the door-side bracket is pivotally coupled to the fuselage-side pivot mount by a bearing.

9. An aircraft fuselage end cargo door mechanism comprising:
   a pair of hinges rotatably coupling an aircraft fuselage end cargo door to a fuselage, the pair of hinges being coupled to both the aircraft fuselage end cargo door and the fuselage; and
   a common axis of rotation defined by the pair of hinges, where
      the aircraft fuselage end cargo door rotates relative to the fuselage about the common axis of rotation, and
      an entirety of the common axis of rotation is located forward of an entirety of a major joint line between the aircraft fuselage end cargo door and the fuselage;
   wherein a skin of the aircraft fuselage end cargo door, rotating about the common axis of rotation, forms an unarticulated monolithic surface and a skin of the fuselage adjacent the major joint line is unarticulated.

10. The aircraft fuselage end cargo door mechanism of claim 9, wherein one hinge of the pair of hinges is laterally spaced from another hinge in the pair of hinges, relative to a longitudinal axis of the fuselage, so as to stably maintain rotation of the aircraft fuselage end cargo door relative to the fuselage.

11. The aircraft fuselage end cargo door mechanism of claim 9, wherein the aircraft fuselage end cargo door comprises one or more of a nose cargo door and a tail cargo door.

12. The aircraft fuselage end cargo door mechanism of claim 11, wherein the nose cargo door comprises a cockpit area.

13. The aircraft fuselage end cargo door mechanism of claim 9, wherein the fuselage end cargo door comprises a fuselage nose cone.

14. The aircraft fuselage end cargo door mechanism of claim 9, wherein the fuselage end cargo door comprises a fuselage tail cone.

15. An aircraft fuselage end cargo door mechanism comprising:
   a hinge rotatably coupling an aircraft fuselage end cargo door to a fuselage, the hinge being coupled to both the aircraft fuselage end cargo door and the fuselage so as to form an axis of rotation of the aircraft fuselage end cargo door; and
   a major joint line defined by an interface between the aircraft fuselage end cargo door and the fuselage, where an entirety of the axis of rotation of the aircraft fuselage end cargo door is located forward of an entirety of the major joint line;
   wherein a skin of the aircraft fuselage end cargo door, rotating about the axis of rotation, forms an unarticulated monolithic surface and a skin of the fuselage adjacent the major joint line is unarticulated.

16. The aircraft fuselage end cargo door mechanism of claim 15, wherein an uppermost portion of the major joint line comprises a joint line radius where a portion of the joint line radius formed by the aircraft fuselage end cargo door pivots within another portion of the joint line radius formed by the fuselage.

17. The aircraft fuselage end cargo door mechanism of claim 16, wherein a center of the joint line radius is substantially co-located with the axis of rotation of the aircraft fuselage end cargo door.

18. The aircraft fuselage end cargo door mechanism of claim 16, comprising a second hinge rotatably coupling the aircraft fuselage end cargo door to the fuselage, the second hinge being coupled to both the aircraft fuselage end cargo door and the fuselage so as to form a second axis of rotation of the aircraft fuselage end cargo door.

19. The aircraft fuselage end cargo door mechanism of claim 18, wherein the axis of rotation and the second axis of rotation are substantially coincident with each other so as to form a common axis of rotation of the aircraft fuselage end cargo door.

20. The aircraft fuselage end cargo door mechanism of claim 15, wherein the aircraft fuselage end cargo door comprises one or more of a nose cargo door and a tail cargo door.

* * * * *